US012619836B2

(12) United States Patent
Takamiya

(10) Patent No.: US 12,619,836 B2
(45) Date of Patent: May 5, 2026

(54) INFORMATION PROCESSING SYSTEM, INFORMATION PROCESSING APPARATUS, AND INFORMATION PROCESSING METHOD

(71) Applicant: Yuichi Takamiya, Kanagawa (JP)

(72) Inventor: Yuichi Takamiya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/631,585

(22) Filed: Apr. 10, 2024

(65) Prior Publication Data

US 2024/0256799 A1      Aug. 1, 2024

Related U.S. Application Data

(63) Continuation of application No. 17/018,041, filed on Sep. 11, 2020, now Pat. No. 12,008,335, which is a
(Continued)

(30) Foreign Application Priority Data

Oct. 5, 2016      (JP) ................................. 2016-197253

(51) Int. Cl.
*H04M 3/56*          (2006.01)
*G06F 40/49*          (2020.01)
(Continued)

(52) U.S. Cl.
CPC .............. *G06F 40/58* (2020.01); *G06F 40/49* (2020.01); *G06V 10/95* (2022.01); *G06V 30/246* (2022.01);
(Continued)

(58) Field of Classification Search
USPC ................... 704/1–10, 200–275; 706/11–25
See application file for complete search history.

(56) References Cited

U.S. PATENT DOCUMENTS 5,751,957 A      5/1998 Hiroya et al.
8,180,624 B2      5/2012 Moore
(Continued)

FOREIGN PATENT DOCUMENTS

JP          H11-250066 A          9/1999
JP          2004-260430 A          9/2004
(Continued)

OTHER PUBLICATIONS

Japanese Office Action mailed Oct. 6, 2020.
(Continued)

*Primary Examiner* — Marcellus J Augustin
(74) *Attorney, Agent, or Firm* — Harness, Dickey & Pierce, P.L.C.

(57) ABSTRACT

An information processing system is communicable with a translation server through a network, and includes a receiver, circuitry, and a transmitter. The receiver receives content data indicating contents expressed in a first language and destination information indicating a destination to which the content data is to be transmitted. The circuitry determines, based on the destination information received by the receiver, a second language as a target language into which the contents expressed in the first language is to be translated. The transmitter transmits, to the destination indicated by the destination information, translated content data indicating contents that is translated by the translation server from the first language to the second language.

19 Claims, 20 Drawing Sheets

Related U.S. Application Data continuation of application No. 16/373,861, filed on Apr. 3, 2019, now Pat. No. 10,956,686, which is a continuation of application No. 15/698,699, filed on Sep. 8, 2017, now Pat. No. 10,354,012.

(51) Int. Cl.

| | |
|---|---|
| *G06F 40/58* | (2020.01) |
| *G06V 10/94* | (2022.01) |
| *G06V 30/246* | (2022.01) |
| *G06F 3/16* | (2006.01) |
| *G06V 30/10* | (2022.01) |
| *G06V 30/224* | (2022.01) |
| *G10L 15/22* | (2006.01) |
| *G10L 15/26* | (2006.01) |

(52) U.S. Cl.

CPC .............. *G06F 3/167* (2013.01); *G06V 30/10* (2022.01); *G06V 30/224* (2022.01); *G10L 15/22* (2013.01); *G10L 15/26* (2013.01)

(56) References Cited

U.S. PATENT DOCUMENTS

| | | | | |
|---|---|---|---|---|
| 8,325,883 | B2 * | 12/2012 | Schultz ............. | H04M 3/42391 709/227 |
| 8,386,265 | B2 | 2/2013 | Subramanian et al. | |
| 8,473,555 | B2 | 6/2013 | Lai et al. | |
| 9,710,464 | B1 * | 7/2017 | Undavalli .......... | G10L 19/0018 |
| 9,984,072 | B2 | 5/2018 | Shin et al. | |
| 10,354,012 | B2 | 7/2019 | Takamiya | |
| 2003/0105621 | A1 | 6/2003 | Mercier | |
| 2006/0133585 | A1 * | 6/2006 | Daigle .................. | G06F 40/263 379/88.06 |
| 2006/0184370 | A1 | 8/2006 | Kwak et al. | |
| 2007/0168450 | A1 | 7/2007 | Prajapat et al. | |
| 2008/0126077 | A1 | 5/2008 | Thorn | |
| 2009/0313007 | A1 | 12/2009 | Bajaj et al. | |
| 2010/0179802 | A1 | 7/2010 | Best et al. | |
| 2010/0185434 | A1 * | 7/2010 | Burvall ................. | G10L 15/005 704/3 |
| 2010/0198579 | A1 * | 8/2010 | Cunnington ........ | H04L 12/1822 704/3 |
| 2010/0299150 | A1 | 11/2010 | Fein et al. | |
| 2011/0134910 | A1 | 6/2011 | Chao-Suren et al. | |
| 2012/0069131 | A1 | 3/2012 | Abelow | |
| 2012/0166176 | A1 | 6/2012 | Nakamura et al. | |
| 2012/0185236 | A1 | 7/2012 | Blodgett et al. | |
| 2012/0197629 | A1 | 8/2012 | Nakamura et al. | |
| 2012/0284014 | A1 * | 11/2012 | Zivkovic ................ | G06F 40/58 704/3 |
| 2013/0226557 | A1 * | 8/2013 | Uszkoreit ............... | H04M 3/56 704/E15.001 |
| 2014/0149880 | A1 * | 5/2014 | Farouki ............. | H04N 1/00129 715/748 |
| 2014/0269678 | A1 | 9/2014 | McGee et al. | |
| 2014/0330794 | A1 | 11/2014 | Dellenbach et al. | |
| 2014/0358632 | A1 | 12/2014 | Graff et al. | |
| 2015/0088484 | A1 | 3/2015 | Bostick et al. | |
| 2015/0100301 | A1 | 4/2015 | Phadke | |
| 2015/0154185 | A1 * | 6/2015 | Waibel .................. | G10L 15/005 704/2 |
| 2015/0161115 | A1 | 6/2015 | Cuthbert et al. | |
| 2015/0278365 | A1 | 10/2015 | Bennett | |
| 2015/0309996 | A1 | 10/2015 | Han | |
| 2015/0317120 | A1 | 11/2015 | Kim et al. | |
| 2016/0034447 | A1 | 2/2016 | Shin et al. | |
| 2016/0110348 | A1 | 4/2016 | Issaev | |
| 2016/0275057 | A1 | 9/2016 | Dendi et al. | |
| 2019/0273767 | A1 * | 9/2019 | Nelson ................ | H04M 7/0027 |

FOREIGN PATENT DOCUMENTS

| | | |
|---|---|---|
| JP | 2009-289197 A | 12/2009 |
| JP | 2011209730 A | 10/2011 |
| WO | 2011/040056 A1 | 4/2011 |

OTHER PUBLICATIONS

U.S. Notice of Allowance in corresponding U.S. Appl. No. 16/373,861 mailed Nov. 17, 2020.
Notice of Allowance dated Feb. 5, 2024, issued in corresponding U.S. Appl. No. 17/018,041.

* cited by examiner

FIG. 2

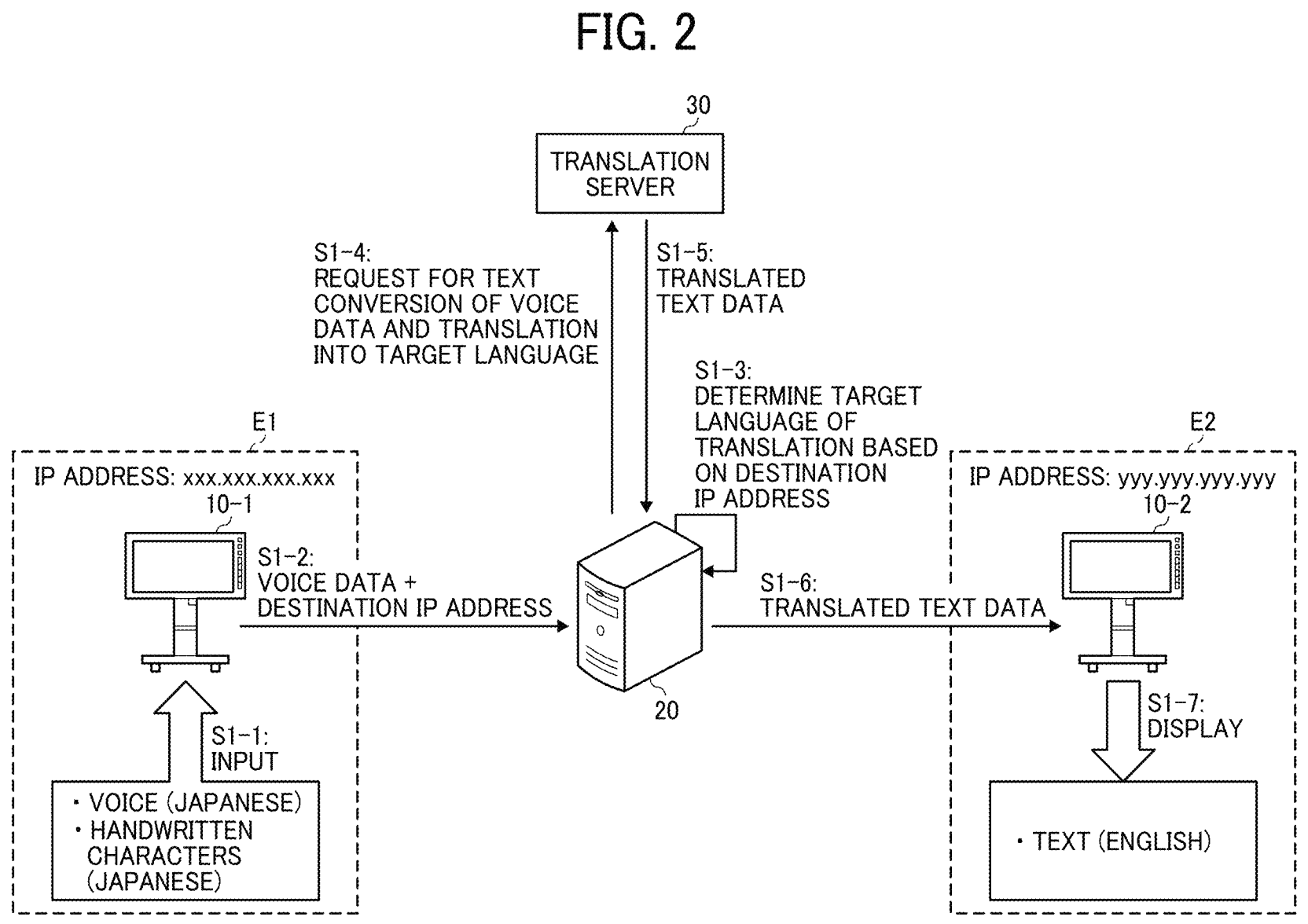

TRANSLATION SERVER 30

S1-5: TRANSLATED TEXT DATA

S1-4: REQUEST FOR TEXT CONVERSION OF VOICE DATA AND TRANSLATION INTO TARGET LANGUAGE

S1-3: DETERMINE TARGET LANGUAGE OF TRANSLATION BASED ON DESTINATION IP ADDRESS

20

E2

IP ADDRESS: yyy.yyy.yyy.yyy
10-2

S1-7: DISPLAY

· TEXT (ENGLISH)

S1-6: TRANSLATED TEXT DATA

E1

IP ADDRESS: xxx.xxx.xxx.xxx
10-1

S1-2: VOICE DATA + DESTINATION IP ADDRESS

S1-1: INPUT

· VOICE (JAPANESE)
· HANDWRITTEN CHARACTERS (JAPANESE)

| IP ADDRESS | COUNTRY NAME |
|---|---|
| aaa.aaa.aaa.0 ~ aaa.aaa.aaa.255 | GERMANY |
| xxx.xxx.xxx.0 ~ xxx.xxx.xxx.255 | JAPAN |
| yyy.yyy.yyy.0 ~ yyy.yyy.yyy.255 | UNITED STATES |
| zzz.zzz.zzz.0 ~ zzz.zzz.zzz.255 | RUSSIA |
| ⋮ | ⋮ |

| COUNTRY NAME | TARGET LANGUAGE |
|---|---|
| GERMANY | GERMAN |
| JAPAN | JAPANESE |
| UNITED STATES | ENGLISH |
| RUSSIA | RUSSIAN |
| ⋮ | ⋮ |

FIG. 8

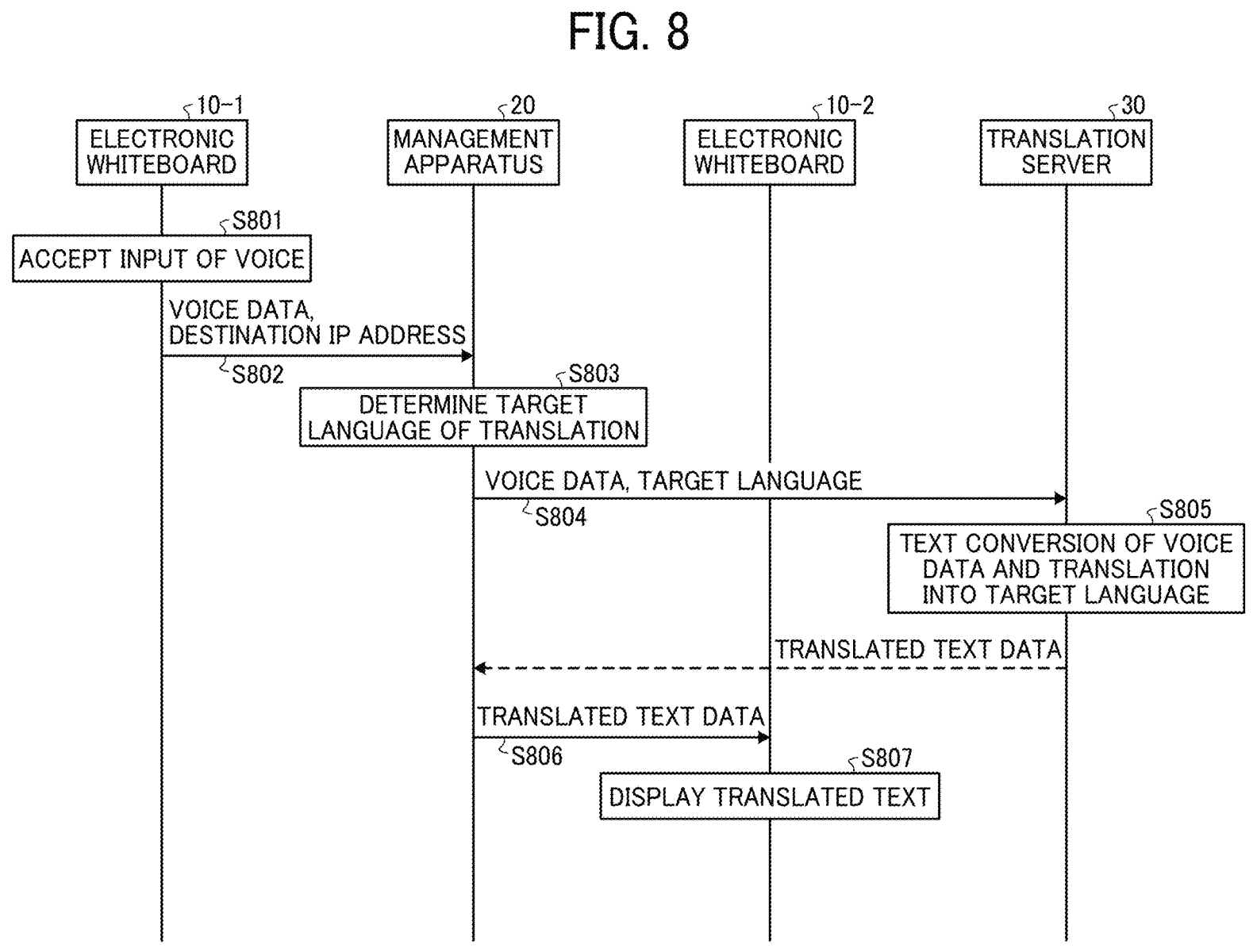

ELECTRONIC WHITEBOARD 10-1

ELECTRONIC WHITEBOARD 10-2

MANAGEMENT APPARATUS 20

TRANSLATION SERVER 30

S801 ACCEPT INPUT OF VOICE

S802 VOICE DATA, DESTINATION IP ADDRESS

S803 DETERMINE TARGET LANGUAGE OF TRANSLATION

S804 VOICE DATA, TARGET LANGUAGE

S805 TEXT CONVERSION OF VOICE DATA AND TRANSLATION INTO TARGET LANGUAGE

S806 TRANSLATED TEXT DATA

S807 TRANSLATED TEXT DATA

DISPLAY TRANSLATED TEXT

| TARGET LANGUAGE | SERVER NAME |
|---|---|
| GERMAN | SERVER B |
| JAPANESE | SERVER A |
| ENGLISH | SERVER C |
| RUSSIAN | SERVER D |
| ⋮ | ⋮ |

START

S1001

REFER TO COUNTRY TABLE TO IDENTIFY
COUNTRY NAME TO WHICH DESTINATION
IP ADDRESS IS ASSIGNED

S1002

REFER TO TARGET LANGUAGE TABLE TO
IDENTIFY TARGET LANGUAGE
ASSOCIATED WITH COUNTRY NAME

S1501

REFER TO TRANSLATION SEVER
INFORMATION TABLE TO IDENTIFY
SERVER APPARATUS ASSOCIATED WITH
TARGET LANGUAGE

END

FIG. 16

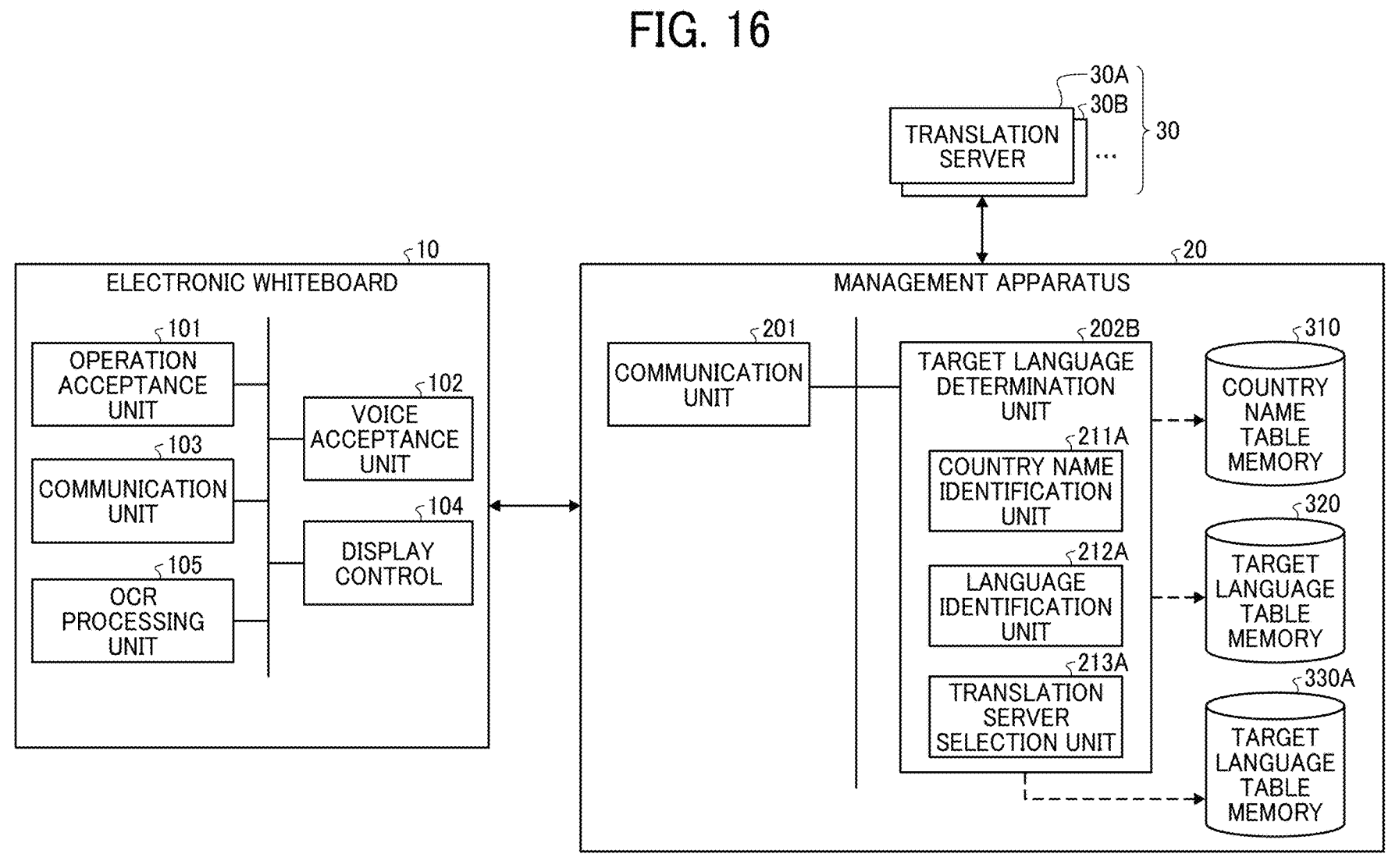

ELECTRONIC WHITEBOARD 10

OPERATION ACCEPTANCE UNIT 101

VOICE ACCEPTANCE UNIT 102

COMMUNICATION UNIT 103

DISPLAY CONTROL 104

OCR PROCESSING UNIT 105

TRANSLATION SERVER 30
30A
30B
30

MANAGEMENT APPARATUS 20

COMMUNICATION UNIT 201

TARGET LANGUAGE DETERMINATION UNIT 202B

COUNTRY NAME IDENTIFICATION UNIT 211A

LANGUAGE IDENTIFICATION UNIT 212A

TRANSLATION SERVER SELECTION UNIT 213A

COUNTRY NAME TABLE MEMORY 310

TARGET LANGUAGE TABLE MEMORY 320

TARGET LANGUAGE TABLE MEMORY 330A

| SOURCE LANGUAGE | TARGET LANGUAGE | SERVER NAME |
|---|---|---|
| JAPANESE | GERMAN | SERVER B |
| JAPANESE | ENGLISH | SERVER C |
| JAPANESE | RUSSIAN | SERVER D |
| GERMAN | JAPANESE | SERVER A |
| GERMAN | ENGLISH | SERVER E |
| ⋮ | ⋮ | ⋮ |

FIG. 18

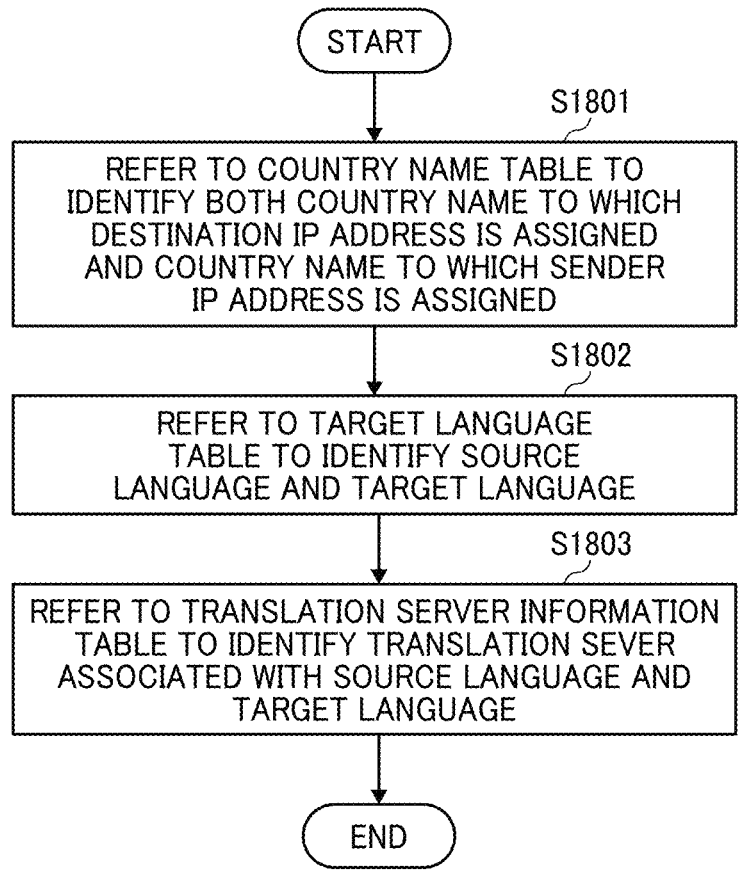

START

S1801

REFER TO COUNTRY NAME TABLE TO IDENTIFY BOTH COUNTRY NAME TO WHICH DESTINATION IP ADDRESS IS ASSIGNED AND COUNTRY NAME TO WHICH SENDER IP ADDRESS IS ASSIGNED

S1802

REFER TO TARGET LANGUAGE TABLE TO IDENTIFY SOURCE LANGUAGE AND TARGET LANGUAGE

S1803

REFER TO TRANSLATION SERVER INFORMATION TABLE TO IDENTIFY TRANSLATION SEVER ASSOCIATED WITH SOURCE LANGUAGE AND TARGET LANGUAGE

END

| IP ADDRESS | USE LANGUAGE |
|---|---|
| xxx.xxx.xxx.xxx | JAPANESE |
| yyy.yyy.yyy.yyy | ENGLISH |
| ⋮ | ⋮ |

FIG. 23

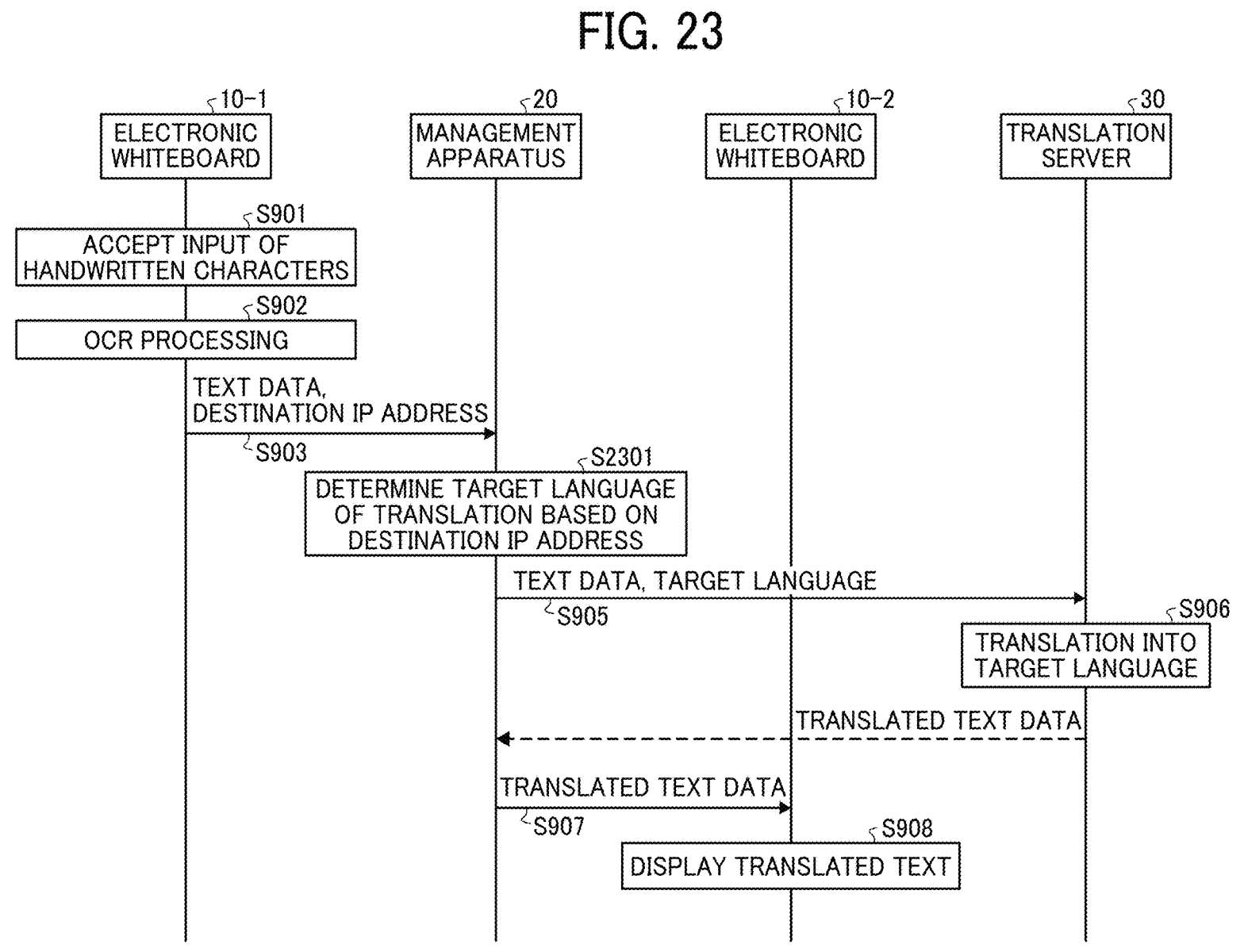

TRANSLATION SERVER 30

ELECTRONIC WHITEBOARD 10-2

MANAGEMENT APPARATUS 20

ELECTRONIC WHITEBOARD 10-1

S901 ACCEPT INPUT OF HANDWRITTEN CHARACTERS

S902 OCR PROCESSING

S903 TEXT DATA, DESTINATION IP ADDRESS

S2301 DETERMINE TARGET LANGUAGE OF TRANSLATION BASED ON DESTINATION IP ADDRESS

S905 TEXT DATA, TARGET LANGUAGE

S906 TRANSLATION INTO TARGET LANGUAGE

S908 TRANSLATED TEXT DATA

S907 TRANSLATED TEXT DATA

DISPLAY TRANSLATED TEXT

INFORMATION PROCESSING SYSTEM, INFORMATION PROCESSING APPARATUS, AND INFORMATION PROCESSING METHOD

CROSS-REFERENCE TO RELATED APPLICATIONS

This is a continuation of U.S. application Ser. No. 17/018,041, filed Sep. 11, 2020, which claims priority under 35 U.S.C. § 120/121 to U.S. application Ser. No. 16/373,861, filed Apr. 3, 2019, which is a continuation of U.S. application Ser. No. 15/698,699 filed Sep. 8, 2017, which claims priority pursuant to 35 U.S.C. § 119(a) to Japanese Patent Application No. 2016-197253, filed on Oct. 5, 2016 in the Japan Patent Office, the disclosures of each of which are hereby incorporated by reference in their entirety.

BACKGROUND

Technical Field

The present disclosure relates to an information processing system, an information processing apparatus, and an information processing method.

Description of the Related Art

Recently, various functions are provided as cloud services. For example, a service (translation service) is provided, enabling to translate audio data into text data by using speech recognition technology and translate the text data into a different language.

In addition, a technique is known that performs voice recognition on speeches by participants in a videoconference that is held among two or more sites, and inserts subtitles representing a result of the voice recognition into video.

SUMMARY

An information processing system is communicable with a translation server through a network, and includes a receiver, circuitry, and a transmitter. The receiver receives content data indicating contents expressed in a first language and destination information indicating a destination to which the content data is to be transmitted. The circuitry determines, based on the destination information received by the receiver, a second language as a target language into which the contents expressed in the first language is to be translated. The transmitter transmits, to the destination indicated by the destination information, translated content data indicating contents that is translated by the translation server from the first language to the second language.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 2 is a schematic view illustrating an operation performed by the electronic whiteboard system according to a first embodiment of the present disclosure;

FIG. 5 is a block diagram illustrating an example of a functional configuration of the electronic whiteboard system according to a first embodiment of the present disclosure;

FIG. 6 illustrates an example of a country name table according to an embodiment of the present disclosure;

FIG. 7 illustrates an example of a target language table according to according to an embodiment of the present disclosure;

FIG. 8 is a sequence diagram illustrating an example of a translation process performed by the electronic whiteboard system according to a first embodiment of the present disclosure;

FIG. 11 is a block diagram illustrating an example of a functional configuration of the electronic whiteboard system according to a second embodiment of the present disclosure;

FIG. 12 illustrates an example of a translation server information table according to an embodiment of the present disclosure;

FIG. 16 is a block diagram illustrating an example of a functional configuration of the electronic whiteboard system according to a third embodiment of the present disclosure;

FIG. 17 illustrates another example of the translation server information table according to an embodiment of the present disclosure;

FIG. 18 is a flowchart illustrating an example of a process of determining a target language and a translation server according to a third embodiment of the present disclosure;

FIG. 20 illustrates an example of a language management table according to according to an embodiment of the present disclosure;

FIG. 23 is a sequence diagram illustrating another example of a translation process performed by the electronic whiteboard system according to a fourth embodiment of the present disclosure.

Figure 1:
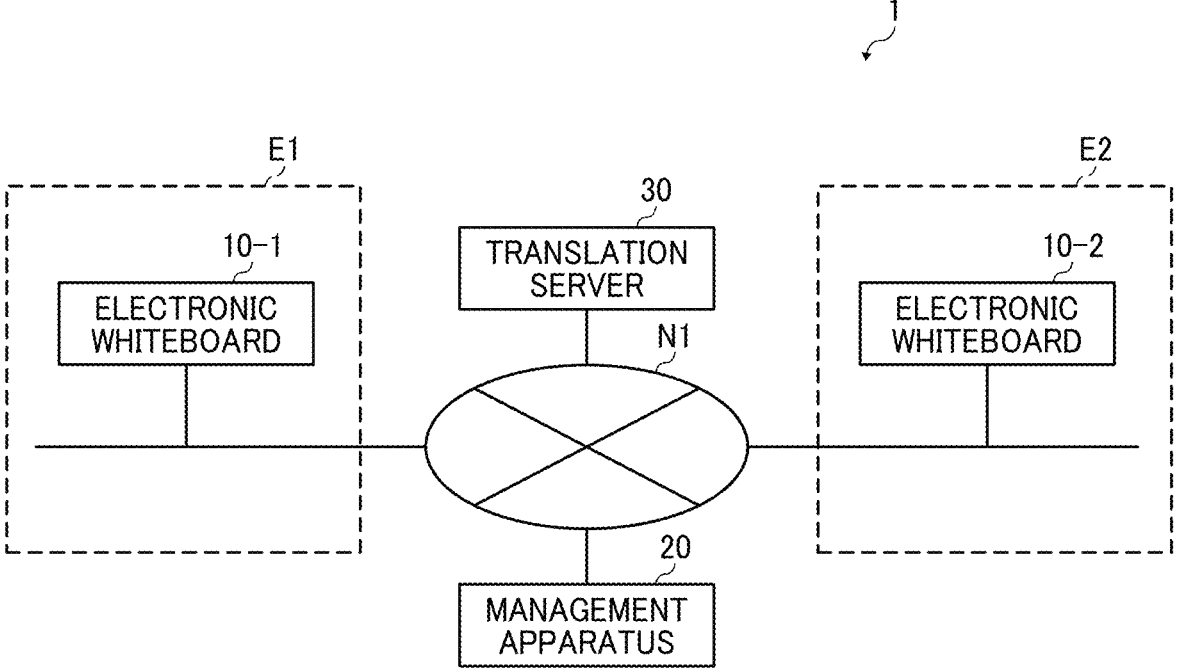
FIG. 1 is a schematic view illustrating an example configuration of an electronic whiteboard system according to a first embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Hereinafter, a description is given of several embodiments of the present disclosure with reference to drawings.

First Embodiment

<Overview of System Configuration>

First, a description is given of an overview of a configuration of an electronic whiteboard system 1 according to an embodiment of the present disclosure, with reference to FIG. 1. FIG. 1 a schematic view illustrating an example configuration of the electronic whiteboard system 1 according to the present embodiment.

As illustrated in FIG. 1, the electronic whiteboard system 1 according to the present embodiment includes plural electronic whiteboards 10 (electronic whiteboard 10-1, electronic whiteboard 10-2, etc.), and a management apparatus 20, which are communicably connected to one another via a wide area network N1, such as the Internet. In addition, the electronic whiteboard system 1 according to the present embodiment is communicably connected to a translation server 30 via the network N1. In order to simplify the description, the electronic whiteboards 10-1, 10-2, etc., are referred to as the electronic whiteboard 10, unless they have to be distinguished.

The electronic whiteboard 10 is a device that enables users at plural sites to conduct a meeting or a lecture. The electronic whiteboard 10 collects voice using a microphone. Further, the electronic whiteboard 10 performs optical character recognition (OCR) on handwritten characters that are input using an electronic pen or the like. The electronic whiteboard 10 is also referred to as an interactive whiteboard (IWB).

Furthermore, when conducting a meeting, a lecture, etc., among plural sites, one of the electronic whiteboards 10 requests, via the management apparatus 20, the translation server 30 to translate voice or text that is input to the electronic whiteboard 10 (from Japanese to English, for example). The other electronic whiteboard(s) 10 displays the translated contents.

In this embodiment, a description is given of an example in which a meeting is held between the electronic whiteboard 10-1 that is placed at a site E1 and the electronic whiteboard 10-2 that is placed at a site E2. For example, the site E1 is an office in Japan, while the site E2 is an office in the United States.

In the electronic whiteboard system 1 according to the present embodiment, voice or text (text obtained by performing OCR processing on handwritten characters) that is input to the electronic whiteboard 10-1 in Japanese is translated into English by the translation server 30. The electronic whiteboard 10-2 outputs (displays) the translated contents. In substantially the same manner, voice or text that is input to the electronic whiteboard 10-2 in English is translated into Japanese by the translation server 30. The electronic whiteboard 10-1 outputs (displays) the translated contents.

The management apparatus 20 is a computer (information processing apparatus) that determines a target language of translation into which the voice or text that is input to the electronic whiteboard 10 is to be translated. More specifically, the management apparatus 20 determines the target language into which voice or text (text obtained by performing OCR processing on handwritten characters) that is input to the electronic whiteboard 10 is to be translated, and requests the translation server 30 to translate the voice or text into the determined target language. Further, the management apparatus 20 causes the other electronic whiteboard 10 to display a result of translation performed by the translation server 30.

The translation server 30 is an external computer or computer system that provides a service (translation service) for translating contents into a target language as a cloud service. The translation server 30 provides the translation service using artificial intelligent (AI) technology or intelligent agent (AI) technology, for example.

More specifically, in response to receiving voice data representing voice that is input to the electronic whiteboard 10 and designation of the target language, for example, the translation server 30 converts the voice data to text data, and translates the converted text data into the target language. Further, in response to receiving text data representing text that is input to the electronic whiteboard 10 and designation of the target language, for example, the translation server 30 translates this text data into the target language.

Although in the present embodiment a description is given of an example in which the translation server 30 provides a translation service implemented by a cloud service, the present embodiment is not limited thereto. For example, the translation server 30 may be a service provided by an application service provider (ASP), or a web service. Furthermore, the translation server 30 may be included in the electronic whiteboard system 1. In other words, the translation server 30 may provide a translation service as an on-premises service.

The configuration illustrated in FIG. 1 is just one example of the configuration of the electronic whiteboard system 1, and the electronic whiteboard system 1 may have any other suitable system configuration. For example, the management apparatus 20 may be included in the electronic whiteboard 10. In other words, the electronic whiteboard 10 and the management apparatus 20 may be configured as a single apparatus.

Furthermore, the electronic whiteboard system 1 may include, in alternative to the electronic whiteboard 10, a personal computer (PC), a smartphone, a tablet terminal, a video game apparatus, a videoconference terminal used for a videoconference, or a multifunction peripheral (MFP), for example. In other words, in the present embodiment, an electronic apparatus that implements either one or both of input and output of various kinds of data such as voice data may be used in alternative to or in addition to the electronic whiteboard 10. Examples of the electronic apparatus that implements input of data include a microphone, a digital camera, and a digital video camera. Examples of the electronic apparatus that implements output of data include a speaker, a display, a digital signage, and a projector.

<Overview of Operation>

Next, a description is given of an overview of an operation performed by the electronic whiteboard system 1 according to the present embodiment, with reference to FIG. 2. FIG. 2 is a schematic view illustrating an operation performed by the electronic whiteboard system 1 according to the present embodiment. Referring to FIG. 2, a description is given of an example in which a meeting, a lecture, or the like is held between the electronic whiteboard 10-1 at the site E1, whose internet protocol (IP) address is xxx.xxx.xxx.xxx, and the electronic whiteboard 10-2 at the site E2, whose IP address is yyy.yyy.yyy.yyy. In other words, a description is given assuming that a user at the site E1 and a user at the site E2 are participating in a same meeting in different languages from each other, using the electronic whiteboard 10-1 and the electronic whiteboard 10-2, respectively.

S1-1: A user who is participating in the meeting at the site E1 inputs voice or handwritten characters into the electronic whiteboard 10-1 in Japanese. The following description is given assuming that voice in Japanese is input to the electronic whiteboard 10-1.

S1-2: In response to the input of voice, the electronic whiteboard 10-1 transmits, to the management apparatus 20, voice data representing the inputted voice and an IP address (destination IP address) "yyy.yyy.yyy.yyy" of the electronic whiteboard 10-2 to which a translation result of the voice is to be transmitted. It should be noted that one of the electronic whiteboards 10-1 and 10-2 stores an IP address of the other one of the electronic whiteboards 10-1 and 10-2 (that is, a counterpart electronic whiteboard 10 used in the same meeting), to which the translation result of voice, etc. is to be transmitted.

S1-3: The management apparatus 20 determines the target language of translation based on the destination IP address. More specifically, the management apparatus 20 first identifies a country (e.g., the United States) to which the destination IP address is assigned, and then identifies the language (e.g., English) used in the identified country. The language identified as above is the target language.

S1-4: The management apparatus 20 transmits, to the translation server 30, the voice data received from the electronic whiteboard 10-1 and designation of the target language identified at S1-3, to request conversion of the voice data to text and translation of the text into the target language.

S1-5: The translation server 30 converts the voice data received from the management apparatus 20 to text data, and translates this text data into the designated target language. The translation server 30 transmits the translated text data to the management apparatus 20 as a response to the request.

S1-6: The management apparatus 20 transmits the translated text data to the electronic whiteboard 10-2 (that is, to the destination IP address "yyy.yyy.yyy.yyy").

S1-7: In response to receiving the translated text data, the electronic whiteboard 10-2 displays text represented by the text data on a display, for example. With the processes from S1-1 to S1-7, voice (Japanese) that is input to the electronic whiteboard 10-1 at the site E1 is translated into English, and displayed as text on the electronic whiteboard 10-2 at the site E2.

As described heretofore, in the electronic whiteboard system 1 according to the present embodiment, the management apparatus 20 determines the target language of translation based on a destination IP address received from one of the plural electronic whiteboards 10. Further, in the electronic whiteboard system 1 according to the present embodiment, text translated into the determined target language is transmitted to the other electronic whiteboard 10.

Thus, in the electronic whiteboard system 1 according to the present embodiment, a user using one of the electronic whiteboards 10 (e.g., a participant in a meeting at the site E1) does not have to know the language of a user who is participating in the same meeting using the other electronic whiteboard 10 (e.g., a participant in the meeting at the site E2). In other words, in the electronic whiteboard system 1 according to the present embodiment, a user of each of the electronic whiteboards 10 is able to cause the translation server 30 to perform translation, without knowing the language of a user who is participating in the same meeting using the other electronic whiteboards 10.

<Hardware Configuration>

Figure 3:
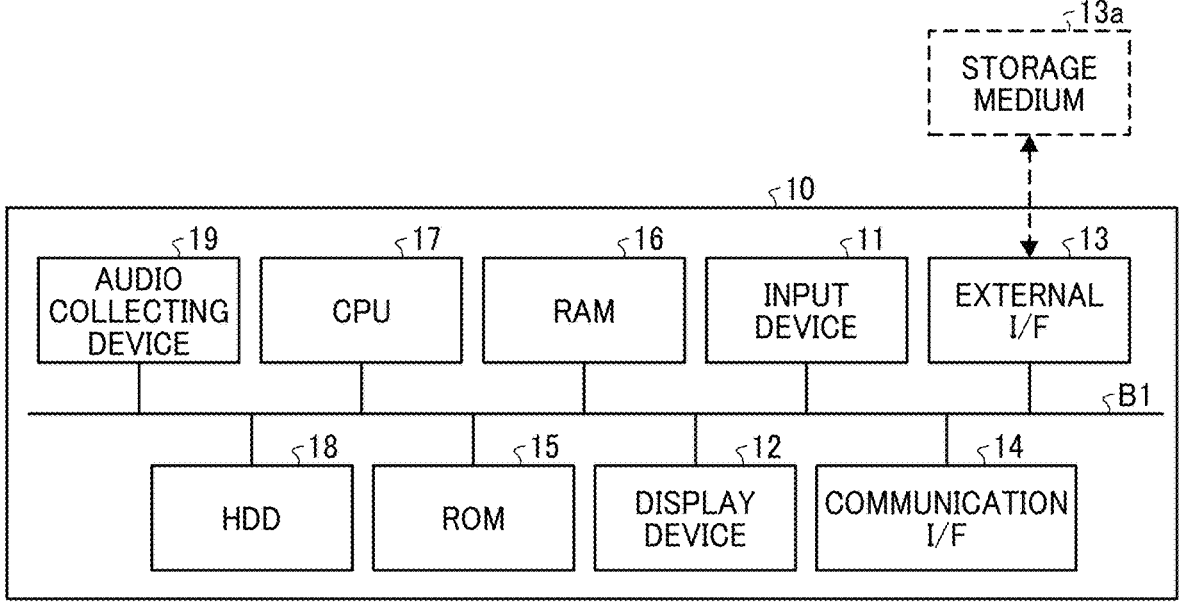
FIG. 3 is a block diagram illustrating an example hardware configuration of an electronic whiteboard according to a first embodiment of the present disclosure.

Hereinafter, a description is given of a hardware configuration of the electronic whiteboard 10 according to the present embodiment, with reference to FIG. 3. FIG. 3 is a block diagram illustrating an example hardware configuration of the electronic whiteboard 10 according to the present embodiment.

As illustrated in FIG. 3, the electronic whiteboard 10 according to the present embodiment includes an input device 11, a display device 12, an external interface 13, a communication interface 14, and a read only memory (ROM) 15. The electronic whiteboard 10 according to the present embodiment further includes a random access memory (RAM) 16, a central processing unit (CPU) 17, a hard disc drive (HDD) 18, and an audio collecting device 19. These hardware devices are connected to one another via a bus B1.

Examples of the input device 11 include a touch panel, enabling an input of various operation instructions such as operation instruction for inputting handwritten characters. Examples of the display device 12 include a display, on which various kinds of information is displayed, such as text representing a result of translation by the translation server 30.

The external interface 13 is an interface device with an external device. Examples of the external device include a storage medium 13a. The external interface 13 enables the electronic whiteboard 10 to read or write data from or to the storage medium 13a. Examples of the storage medium 13a include a universal serial bus (USB) memory, a compact disc (CD), a digital versatile disc (DVD), and an SD memory card.

The communication interface 14 is an interface that connects the electronic whiteboard 10 to the network N1, for example. The electronic whiteboard 10 communicates with other devices such as the management apparatus 20 via the communication interface 14.

The HDD 18 is a nonvolatile storage device that stores programs or data. Examples of the programs or data stored in the HDD 18 include an operating system (OS) for controlling an entire operation of the electronic whiteboard 10 and an application program providing various functions on the OS.

The HDD 18 manages the programs or data stored therein by a predetermined file system and/or a predetermined database. The electronic whiteboard 10 may include, in alternative to the HDD 18, a drive device such as a solid state drive (SSD) that uses a flash memory as a storage medium.

The ROM 15 is a nonvolatile semiconductor memory, which holds programs or data even after the electronic whiteboard 10 is turned off as the power is not supplied. The ROM 15 stores programs or data such as a basic input output system (BIOS), which is executed when the electronic whiteboard 10 is started up, OS settings, and network settings. The RAM 16 is a volatile semiconductor memory, which holds programs or data temporarily.

The CPU 17 reads programs or data from a storage device such as the ROM 15 and the HDD 18 onto the RAM 16, and executes processing to implement the entire control of the electronic whiteboard 10 or functions of the electronic whiteboard 10.

Examples of the audio collecting device 19 include a microphone that collects sounds around the electronic whiteboard 10.

The electronic whiteboard 10 according to the present embodiment implements various processes as described later with the hardware configuration as illustrated in FIG. 3.

Figure 4:
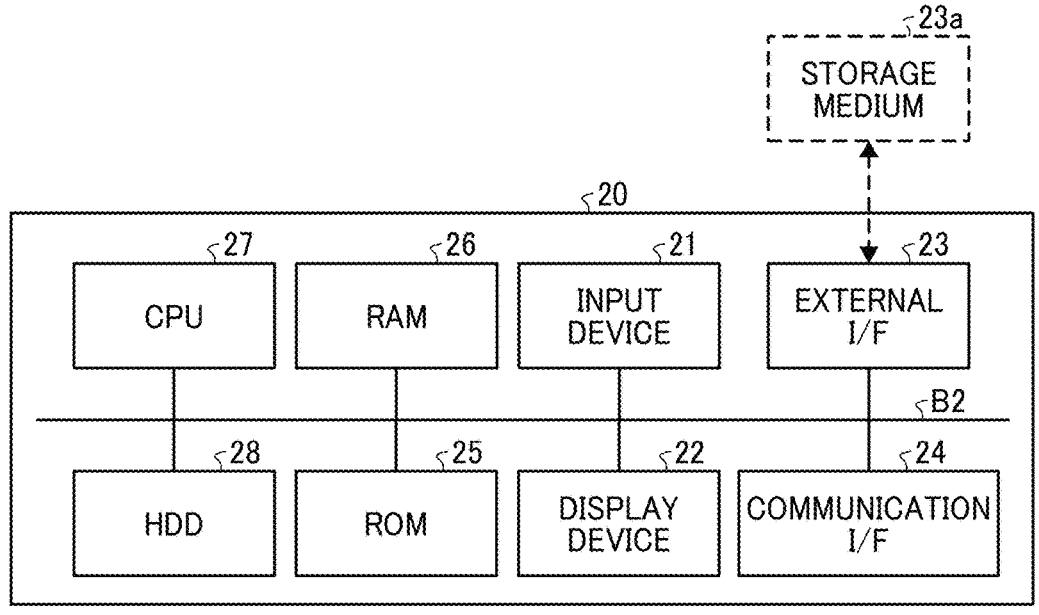
FIG. 4 is a block diagram illustrating an example hardware configuration of a management apparatus according to a first embodiment of the present disclosure.

Hereinafter, a description is given of a hardware configuration of the management apparatus 20 according to the present embodiment, with reference to FIG. 4. FIG. 4 is a block diagram illustrating an example hardware configuration of the management apparatus 20 according to the present embodiment.

As illustrated in FIG. 4, the management apparatus 20 according to the present embodiment includes an input device 21, a display device 22, an external interface 23, and a communication interface 24. The management apparatus 20 according to the present embodiment further includes a ROM 25, a RAM 26, a CPU 27, and an HDD 28. These hardware devices are connected to one another via a bus B2.

Examples of the input device 21 include a keyboard, a mouse, and a touch panel, enabling an input of various operation instructions. Examples of the display device 22 include a display, on which various kinds of information are displayed. It should be noted that the input device 21 and the display device 22 are not necessarily constantly connected to the bus B2. In other words, at least one of the input device 21 and the display device 22 could be connected to the management apparatus 20 as necessary when used.

The external interface 23 is an interface device with an external device. Examples of the external device include a storage medium 23a. The external interface 23 enables the management apparatus 20 to read or write data from or to the storage medium 23a. Examples of the storage medium 23a include a USB memory, CD, a DVD, and an SD memory card.

The communication interface 24 is an interface that connects the management apparatus 20 to the network N1 or the network N2. The management apparatus 20 communicates with other devices such as the electronic whiteboard 10 or the translation server 30 via the communication interface 24.

The HDD 28 is a nonvolatile storage device that stores programs or data. Examples of the programs or data stored in the HDD 28 include an OS for controlling an entire operation of the management apparatus 20 and an application program providing various functions on the OS.

The HDD 28 manages the programs or data stored therein by a predetermined file system and/or a predetermined database. The management apparatus 20 may include, in alternative to the HDD 28, a drive device such as an SSD that uses a flash memory as a storage medium.

The ROM 25 is a nonvolatile semiconductor memory, which holds programs or data even after the management apparatus 20 is turned off as the power is not supplied. The ROM 25 stores programs and data such as a BIOS, which is executed when the management apparatus 20 is started up, OS settings, and network settings. The RAM 26 is a volatile semiconductor memory, which holds programs or data temporarily.

The CPU 27 reads programs or data from a storage device such as the ROM 25 and the HDD 28 onto the RAM 26, and executes processing to implement the entire control of the management apparatus 20 or functions of the management apparatus 20.

The management apparatus 20 according to the present embodiment implements processes as described later with the hardware configuration as illustrated in FIG. 4.

<Functional Configuration>

Figure 5:
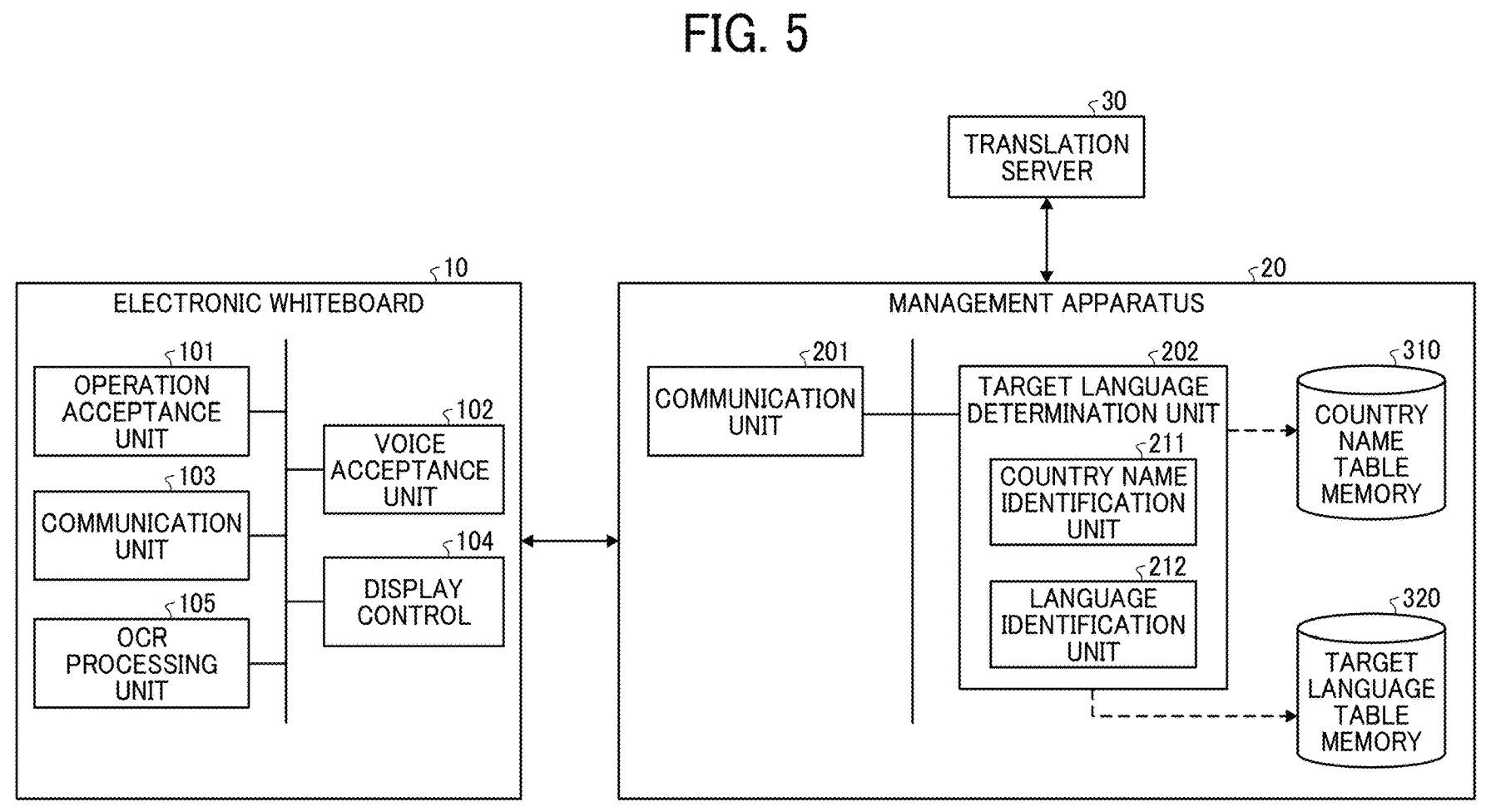

Hereinafter, a description is given of a functional configuration of the electronic whiteboard system 1 according to the present embodiment, with reference to FIG. 5. FIG. 5 is a block diagram illustrating an example of a functional configuration of the electronic whiteboard system 1 according to the present embodiment.

As illustrated in FIG. 5, the electronic whiteboard 10 according to the present embodiment includes an operation acceptance unit 101, a voice acceptance unit 102, a communication unit 103, a display control 104, and an OCR processing unit 105. Each of these functional blocks is implemented by processes executed by the CPU 17 according to one or more programs installed on the electronic whiteboard 10.

The operation acceptance unit 101 accepts various kinds of inputs from a user. More specifically, the operation acceptance unit 101 accepts an operation of inputting handwritten characters, for example.

The voice acceptance unit 102 accepts input of voice. More specifically, the voice acceptance unit 102 accepts input of audio (voice) collected by the audio collecting device 19.

The communication unit 103 communicates various kinds of data with the other devices such as the management apparatus 20. More specifically, the communication unit 103 transmits, to the management apparatus 20, voice data representing the voice of which input is accepted by the voice acceptance unit 102 and an IP address (destination IP address) of the other electronic whiteboard 10 to which a translation result of the voice is to be transmitted, for example. Further, for example, the communication unit 103 transmits, to the management apparatus 20, text data that is generated by the OCR processing unit 105 and an IP address (destination IP address) of the other electronic whiteboard 10 to which a translation result of text represented by the text data is to be transmitted.

The display control 104 controls the display device 12 to display various kinds of information. More specifically, the display control 104 controls the display device 12 to display text represented by the text data (the text data translated by the translation server 30) received from the management apparatus 20, for example.

The OCR processing unit 105 performs OCR processing on handwritten characters of which input operation is accepted by the operation acceptance unit 101, to generate text data of text corresponding to the handwritten characters.

As illustrated in FIG. 5, the management apparatus 20 according to the present embodiment includes a communication unit 201 and a target language determination unit 202. Each of these functional blocks is implemented by processes executed by the CPU 27 according to one or more programs installed on the management apparatus 20.

The management apparatus 20 according to the present embodiment further includes a country name table memory 310, and a target language table memory 320. Each of those memories 310 and 320 is implemented by, for example, the HDD 28. In another example, either one or both of those memories 310 and 320 may be implemented by a storage device connected to the management apparatus 20 via the network N1.

The communication unit 201 communicates various kinds of data with the other devices such as the electronic whiteboard 10 or the translation server 30. More specifically, the communication unit 201 receives the voice data and the destination IP address from the electronic whiteboard 10, for example. Further, the communication unit 201 transmits, to the translation server 30, the voice data and designation of the target language determined by the target language determination unit 202.

The target language determination unit 202 determines a target language based on the destination IP address received by the communication unit 201. The target language determination unit 202 includes a country name identification unit 211 and a language identification unit 212.

The country name identification unit 211 refers to a country name table 410 stored in the country name table memory 310, to identify a country name to which the destination IP address received by the communication unit 201 is assigned.

The language identification unit 212 refers to a target language table 420 stored in the target language table memory 320, to identify a target language based on the country name identified by the country name identification unit 211.

The country name table memory 310 stores the country name table 410. Hereinafter, a description is given of the country name table 410 with reference to FIG. 6. FIG. 6 illustrates an example of the country name table 410.

As illustrated in FIG. 6, the country name table 410 stores an IP address and a country name to which the IP address is assigned, in association with each other.

For example, IP addresses "aaa.aaa.aaa.0" to "aaa.aaa.aaa.255" are associated with a country name "Germany". This means that the IP addresses "aaa.aaa.aaa.0" to "aaa.aaa.aaa.255" are assigned to Germany.

Further, for example, IP addresses "xxx.xxx.xxx.0" to "xxx.xxx.xxx.255" are associated with a country name "Japan". This means that the IP addresses "xxx.xxx.xxx.0" to "xxx.xxx.xxx.255" are assigned to Japan.

Although the country name table 410 illustrated in FIG. 6 stores, for each of a plurality of countries, a country name in association with the IP addresses assigned to the country, any suitable information other than a country may be used. For example, for each of regions such as states, prefectures, cities and districts, an IP address assigned to a region may be associated with the region.

The target language table memory 320 stores the target language table 420. Hereinafter, a description is given of the target language table 420 with reference to FIG. 7. FIG. 7 illustrates an example of the target language table 420.

As illustrated in FIG. 7, the target language table 420 stores a country name in association with a language (target language) used in a country of the country name.

For example, a country name "Germany" is associated with a target language "German". In the same manner, a country name "Japan" is associated with a target language "Japanese". In a case in which multiple languages are used in one country, the most commonly used language from among the multiple languages may be associated with the country name as the target language. In addition, although the target language table 420 illustrated in FIG. 7 stores, for each of a plurality of countries, a country in association with a language used in the country, this is just one example. Alternatively, the target language table 420 may store, for each of the above-described regions, a region in association with a language used in the region.

<Operation>

Hereinafter, a description is given in detail of an operation performed by the electronic whiteboard system 1 according to the present embodiment. The following description is given assuming that a meeting, a lecture, or the like is held between the electronic whiteboard 10-1 and the electronic whiteboard 10-2. It should be noted that one of the electronic whiteboards 10-1 and 10-2 stores an IP address of the other one of the electronic whiteboards 10-1 and 10-2 used in the same meeting (that is, an IP address of the other electronic whiteboard 10 participating in the same meeting) in a predetermined storage area such as the RAM 16 or the HDD 18.

First, a description is given of a process of translating, at the translation server 30, voice that is input to the electronic whiteboard 10-1 and thereafter displaying a result of the translation at the electronic whiteboard 10-2, with reference to FIG. 8. FIG. 8 is a sequence diagram illustrating an example of a translation process performed by the electronic whiteboard system 1 according to the present embodiment.

The voice acceptance unit 102 of the electronic whiteboard 10-1 accepts input of voice (S801). More specifically, the voice acceptance unit 102 accepts input of audio (voice) collected by the audio collecting device 19.

The communication unit 103 of the electronic whiteboard 10-1 transmits, to the management apparatus 20, voice data representing voice of which input is accepted by the voice acceptance unit 102 and a destination IP address (S802). The destination IP address is an IP address of the other electronic whiteboard 10 (i.e., the electronic whiteboard 10-2) participating in the same meeting.

In a case in which two or more other electronic whiteboards 10 are participating in the same meeting, the communication unit 103 of the electronic whiteboard 10 transmits a plurality of destination IP addresses, each corresponding to each of the two or more other electronic whiteboards 10.

In response to receiving the voice data and the destination IP address at the communication unit 201, the target language determination unit 202 of the management apparatus 20 determines a target language of translation based on the received destination IP address (S803). A detailed description is given later of a process of determining the target language at S803.

In a case in which the management apparatus 20 receives a plurality of destination IP addresses from the electronic whiteboard 10, the management apparatus 20 determines, for each of the plurality of destination IP addresses, a target language. For example, in a case in which the management apparatus 20 receives a first destination IP address and a second destination IP address, the target language determination unit 202 determines a first target language (e.g., English) based on the first destination IP address, and also determines a second target language (e.g., Germany) based on the second destination IP address.

Next, the communication unit 201 of the management apparatus 20 transmits, to the translation server 30, the voice data and designation of the target language determined by the target language determination unit 202 (S804). With the processes from S801 to S804, the management apparatus 20 requests the translation server 30 to convert voice represented by the voice data into text and translate the text into the designated target language. For example, the management apparatus 20 is capable of issuing this request using a web application program interface (API) that is made open to the public by the translation server 30.

In a case in which the management apparatus 20 determines a plurality of target languages at S803, the management apparatus 20 performs the process of S804 for each of the plurality of target languages. For example, in a case in which the management apparatus 20 determines a first target language and a second target language at S803, the communication unit 201 of the management apparatus 20 transmits the voice data and designation of the first language to the translation server 30, and also transmits the voice data and designation of the second language to the translation server 30.

In response to receiving the voice data and the designation of the target language, the translation server 30 converts the voice data to text data, and translates this text data into the designated target language (S805). Then, the translation server 30 transmits the translated text data to the management apparatus 20.

In response to receiving the translated text data from the translation server 30, the communication unit 201 of the management apparatus 20 transmits this translated text data to the electronic whiteboard 10-2 (S806). In other words, the communication unit 201 transmits the translated text data to the destination IP address.

In a case in which the management apparatus 20 receives a plurality of destination IP addresses at S803, the management apparatus 20 transmits, to each of the plurality of destination IP addresses, text data translated into a target language determined based on each of the plurality of destination IP addresses. More specifically, it is assumed that the management apparatus 20 receives a first destination IP address and a second destination IP address at S803. In this case, the communication unit 201 of the management apparatus 20 transmits text data translated into a target language determined based on the first destination IP address to the first destination IP address. Further, the communication unit 201 of the management apparatus 20 transmits text data translated into a target language determined based on the second destination IP to the second IP address.

The display control 104 of the electronic whiteboard 10-2 displays text represented by the translated text data on the display device 12 (S807). With the processes from S801 to S807, voice (e.g., voice in Japanese) that is input to the electronic whiteboard 10-1 at the site E1 is translated into a language (e.g., English) of a user using the electronic whiteboard 10-2 at the site E2, and is displayed as text.

Although in the above, a description is given of an example in which the electronic whiteboard 10 displays the translated text data on the display device 12 at S807, the translated text data may be output in any other suitable format. The electronic whiteboard 10 may 10 may output the translated text data as audio from a speaker, for example. Alternatively, the electronic whiteboard 10 may store the translated text data in a specific storage area such as the HDD 18.

Figure 9:
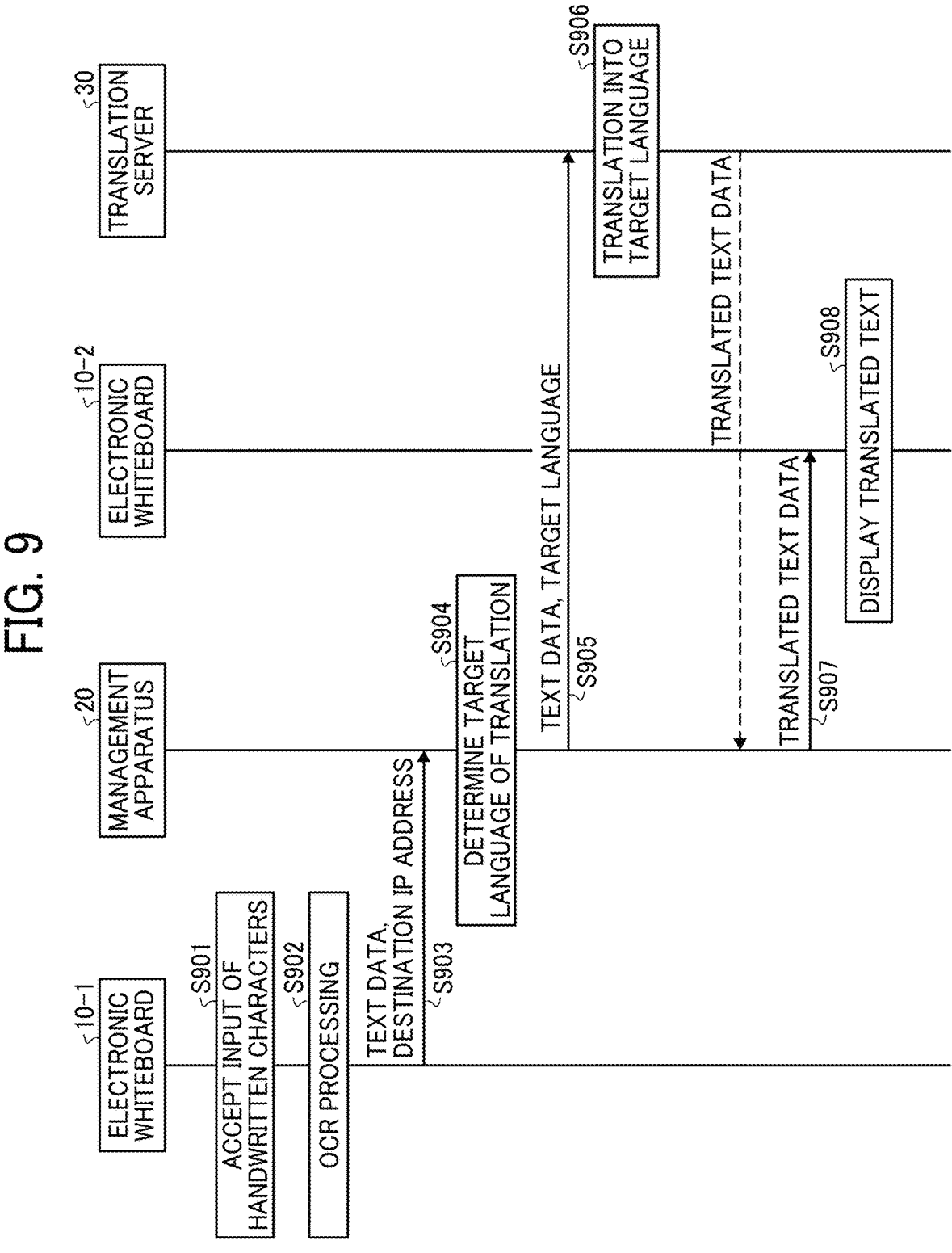
FIG. 9 is a sequence diagram illustrating another example of a translation process performed by the electronic whiteboard system according to a first embodiment of the present disclosure.

Next, a description is given of a process of converting handwritten characters input to the electronic whiteboard 10-1 into text, translating this text at the translation server 30, and thereafter displaying a result of the translation at the electronic whiteboard 10-2, with reference to FIG. 9. FIG. 9 is a sequence diagram illustrating another example of a translation process performed by the electronic whiteboard system 1 according to the present embodiment.

The operation acceptance unit 101 of the electronic whiteboard 10-1 accepts input of handwritten characters (S901).

The OCR processing unit 105 of the electronic whiteboard 10-1 performs OCR processing on the handwritten characters of which input operation is accepted by the operation acceptance unit 101, to generate text data of text corresponding to the handwritten characters (S902).

Next, the communication unit 103 of the electronic whiteboard 10-1 transmits, to the management apparatus 20, the text data generated by the OCR processing unit 105 and the destination IP address (i.e., IP address of the electronic whiteboard 10-2) (S903).

In a case in which two or more other electronic whiteboards 10 are participating in the same meeting, the communication unit 103 of the electronic whiteboard 10 transmits a plurality of destination IP addresses, each corresponding to each of the two or more other electronic whiteboards 10, in substantially the same manner as described above referring to S802 of FIG. 8.

In response to receiving the text data and the destination IP address at the communication unit 201, the target language determination unit 202 of the management apparatus 20 determines a target language of translation based on the received destination IP address (S904). A detailed description is given later of a process of determining the target language at S904.

In a case in which the management apparatus 20 receives a plurality of destination IP addresses from the electronic whiteboard 10, the management apparatus 20 determines, for each of the plurality of destination IP addresses, a target language, in substantially the same manner as described above referring to S803 of FIG. 8.

Next, the communication unit 201 of the management apparatus 20 transmits, to the translation server 30, the text data and designation of the target language determined by the target language determination unit 202 (S905). With the processes from S901 to S905, the management apparatus 20 requests the translation server 30 to translate text represented by the text data into the designated target language. For example, the management apparatus 20 is capable of issuing this request using a web API that is made open to the public by the translation server 30.

In a case in which the management apparatus 20 determines a plurality of target languages at S904, the management apparatus 20 performs the process of S905 for each of the plurality of target languages, in substantially the same manner as described above referring to S804 of FIG. 8.

In response to receiving the text data and the designation of the target language, the translation server 30 translates this text data into the designated target language (S906). Then, the translation server 30 transmits the translated text data to the management apparatus 20.

In response to receiving the translated text data from the translation server 30, the communication unit 201 of the management apparatus 20 transmits this translated text data to the electronic whiteboard 10-2 (S907). In other words, the communication unit 201 transmits the translated text data to the destination IP address.

In a case in which the management apparatus 20 receives a plurality of destination IP addresses at S903, the management apparatus 20 transmits, to each of the plurality of destination IP addresses, text data translated into a target language determined based on each of the plurality of destination IP addresses, in substantially the same manner as described above referring to S806 of FIG. 8.

The display control 104 of the electronic whiteboard 10-2 displays text represented by the translated text data on the display device 12 (S908). With the processes from S901 to S908, text (e.g., text in Japanese) that is input to the electronic whiteboard 10-1 at the site E1 by input of hand-written characters is translated into a language (e.g., English) of a user using the electronic whiteboard 10-2 at the site E2, and is displayed as text.

The electronic whiteboard 10 may output the translated text data as audio from a speaker, for example, or store the translated text data in a specific storage area such as the HDD 18 in substantially the same manner as S908 of FIG. 8.

Figure 10:
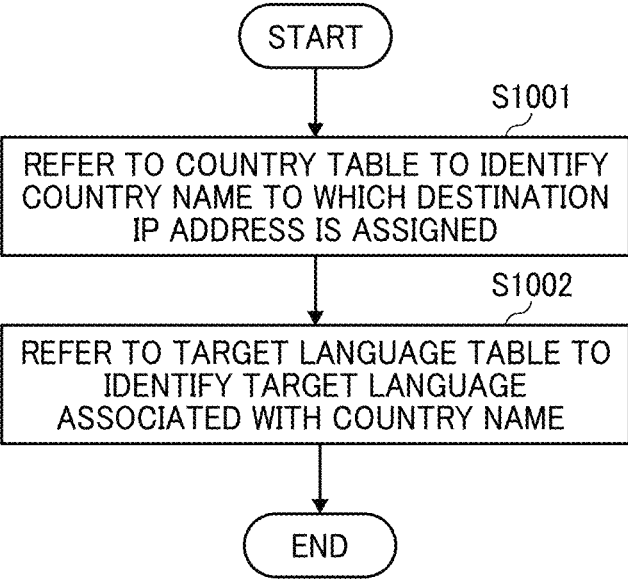
FIG. 10 is a flowchart illustrating an example of a process of determining a target language according to a first embodiment of the present disclosure.

Hereinafter, a description is given in detail of a process of determining the target language at S803 of FIGS. 8 and S904 of FIG. 9, with reference to FIG. 10. FIG. 10 is a flowchart illustrating an example of process of determining the target language according to the present embodiment.

First, the country name identification unit 211 refers to the country name table 410 stored in the country name table memory 310, to identify a country name to which a destination IP address received by the communication unit 201 is assigned (S1001). For example, in a case in which the destination IP address is "yyy.yyy.yyy.100", the country name identification unit 211 identifies a country name "United States" to which this destination IP address is assigned, referring to the country name table 410 illustrated in FIG. 6.

Next, the language identification unit 212 refers to the target language table 420 stored in the target language table memory 320, to identify a target language based on the country name identified by the country name identification unit 211 (S1002). For example, in a case in which the country name identification unit 211 identifies a country name "Unite States" at S1002, the language identification unit 212 identifies a target language "English" associated with "United States", referring to the target language table 420 illustrated in FIG. 7.

Thus, the target language determination unit 202 determines a target language based on a destination IP address received from the electronic whiteboard 10.

Although in the present embodiment, a description is given of a case in which the target language determination unit 202 determines a target language of translation based on a destination IP address, this is just one example. Alternatively, for example, the target language determination unit 202 may determine a target language based on a telephone number or a manufacturing identification number (serial number) of the electronic whiteboard 10 as a destination to which voice data or text data is to be transmitted. Further, the target language determination unit 202 may determine a target language based on a user identifier (ID) of a user who is logging in the electronic whiteboard 10.

In other words, the target language determination unit 202 may determine a target language based on various kinds of destination information identifying the electronic white-board 10 as a destination to which voice data or text data is to be transmitted or a user who is logging in the electronic whiteboard 10.

In a case in which the destination information is a telephone number, the target language determination unit 202 may first identify a country name based on a country code of the telephone number, and thereafter determine a target language based on the identified country name. Further, in a case in which the destination information is a manufacturing identification number, the target language determination unit 202 may first identify a country name based on a sales country code included in the manufacturing identification number, and thereafter determine a target language based on the identified country name. Furthermore, in a case in which the destination information is a user ID, the target language determination unit 202 may first identify a country name based on a nationality associated with the user ID, and thereafter determine a target language based on the identified country name.

As described heretofore, when a meeting, a lecture, etc. is held using a plurality of the electronic whiteboards 10 in different languages, the electronic whiteboard system 1 according to the present embodiment determines a target language of translation based on destination information (e.g., IP address) to which voice data or text data is to be transmitted. Further, the electronic whiteboard system 1 according to the present embodiment requests the translation server 30 to translate the voice data and the text data with designation of the determined target language.

Thus, even when a user using the electronic whiteboard 10 does not know a language of the other user who is participating in the same meeting using the other electronic whiteboard 10, the electronic whiteboard system 1 according to the present embodiment enables the translation server 30 to translate contents into the language of the other user using the other electronic whiteboard 10.

Second Embodiment

Hereinafter, a description is given of a second embodiment of the present disclosure. Different translation services are provided by different service providers, and accuracy or speed of translation may vary depending on the service providers. In view of this, in the second embodiment, when the electronic whiteboard system 1 is capable of using a plurality of translation servers 30, the electronic whiteboard system 1 requests a selected translation server 30 from among the plurality of translation servers 30 to perform translation depending on a target language of translation.

For example, the plurality of translation servers 30 includes a translation server 30A that provides highly accurate translation into Japanese, a translation server 30B that provides highly accurate translation into Germany, a translation server 30C that provides highly accurate translation into English, and a translation server 30D that provides highly accurate translation into Russian. In such case, the electronic whiteboard system 1 according to the second embodiment selects a translation server 30 depending on a target language, and requests the selected translation server 30 to perform translation.

In the following description, for the sake of explanatory convenience, the server names of the translation server 30A, the translation server 30B, the translation server 30C, and the translation server 30D are referred to as a "Server A", "Server B", "Server C", and "Server D", respectively.
<Functional Configuration>

Figure 11:
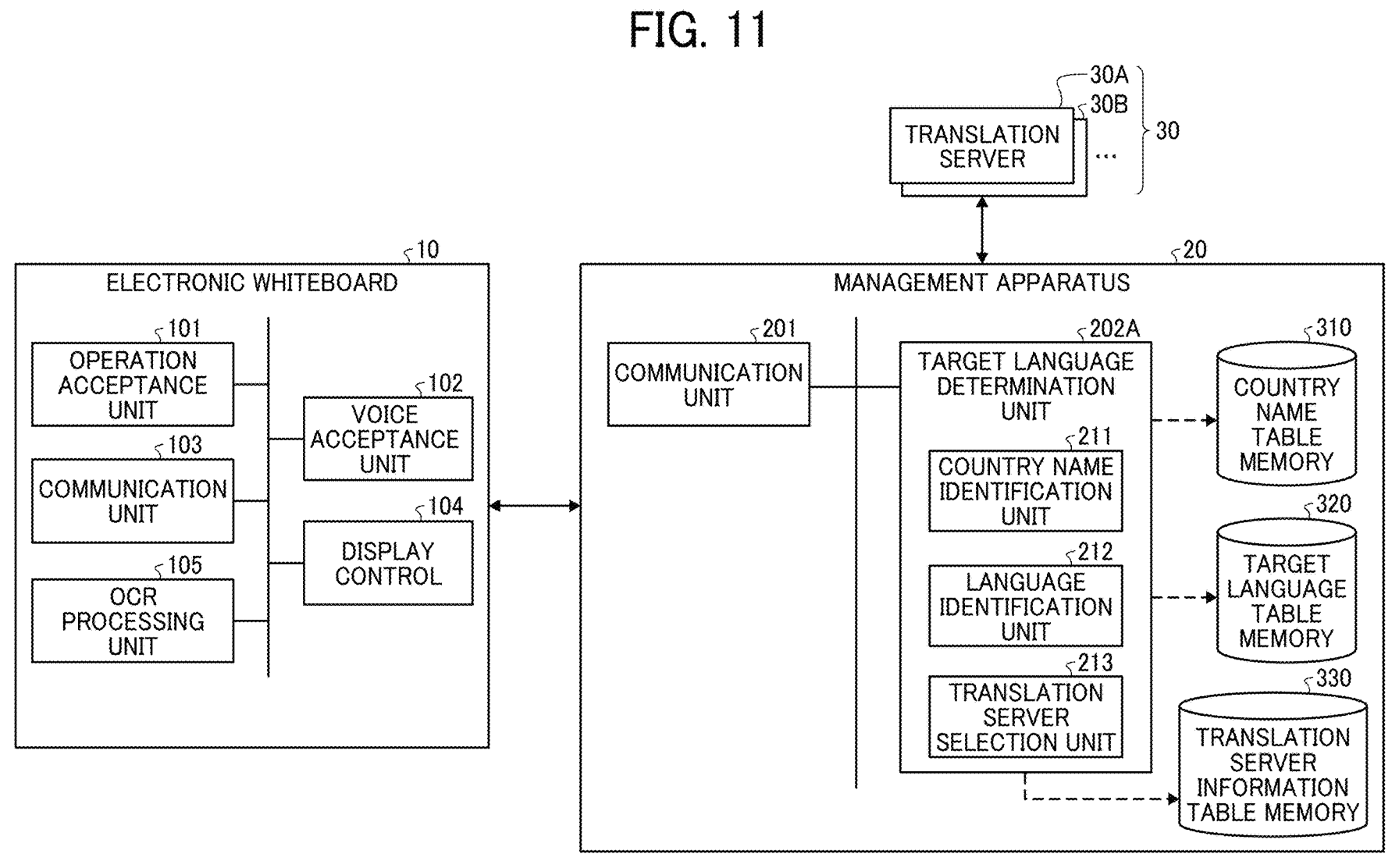

First, a description is given hereinafter of a functional configuration of the electronic whiteboard system 1 according to the second embodiment, with reference to FIG. 11. FIG. 11 is a block diagram illustrating a functional configuration of the electronic whiteboard system 1 according to the second embodiment. Redundant description of functional units that are same as those of the first embodiment described above is omitted below.

As illustrated in FIG. 11, the management apparatus 20 according to the second embodiment includes a target language determination unit 202A. Further, the management apparatus 20 according to the second embodiment includes a translation server information table memory 330. The memory 330 is implemented by, for example, the HDD 28. In another example, the memory 330 may be implemented by a storage device connected to the management apparatus 20 via the network N1.

The target language determination unit 202A determines a target language and the translation server 30 that is to be requested to perform translation, based on a destination IP address received by the communication unit 201. The target language determination unit 202A includes a translation server selection unit 213.

The translation server selection unit 213 refers to a translation server information table 430 stored in the translation server information table memory 330, to determine the translation server 30 that is to translate voice data or text data, based on a target language identified by the language identification unit 212.

The translation server information table memory 330 stores the translation server information table 430. Hereinafter, a description is given of the translation server information table 430, with reference to FIG. 12. FIG. 12 illustrates an example of the translation server information table 430.

As illustrated in FIG. 12, the translation server information table 430 stores a target language in association with a name (server name) of the translation server 30 that performs translation into the associated target language with high accuracy (and/or at high speed).

For example, a target language "German" is associated with a server name "Server B". This means that the translation server 30B having a server name of "Server B", is capable of providing translation with high accuracy, when a target language is German.

Further, a target language "Japanese" is associated with a server name "Server A". This means that the translation server 30A having a server name of "Server A", is capable of providing translation with high accuracy, when a target language is Japanese.

<Operation>

Hereinafter, a description is given in detail of an operation performed by the electronic whiteboard system 1 according to the second embodiment.

Figure 13:
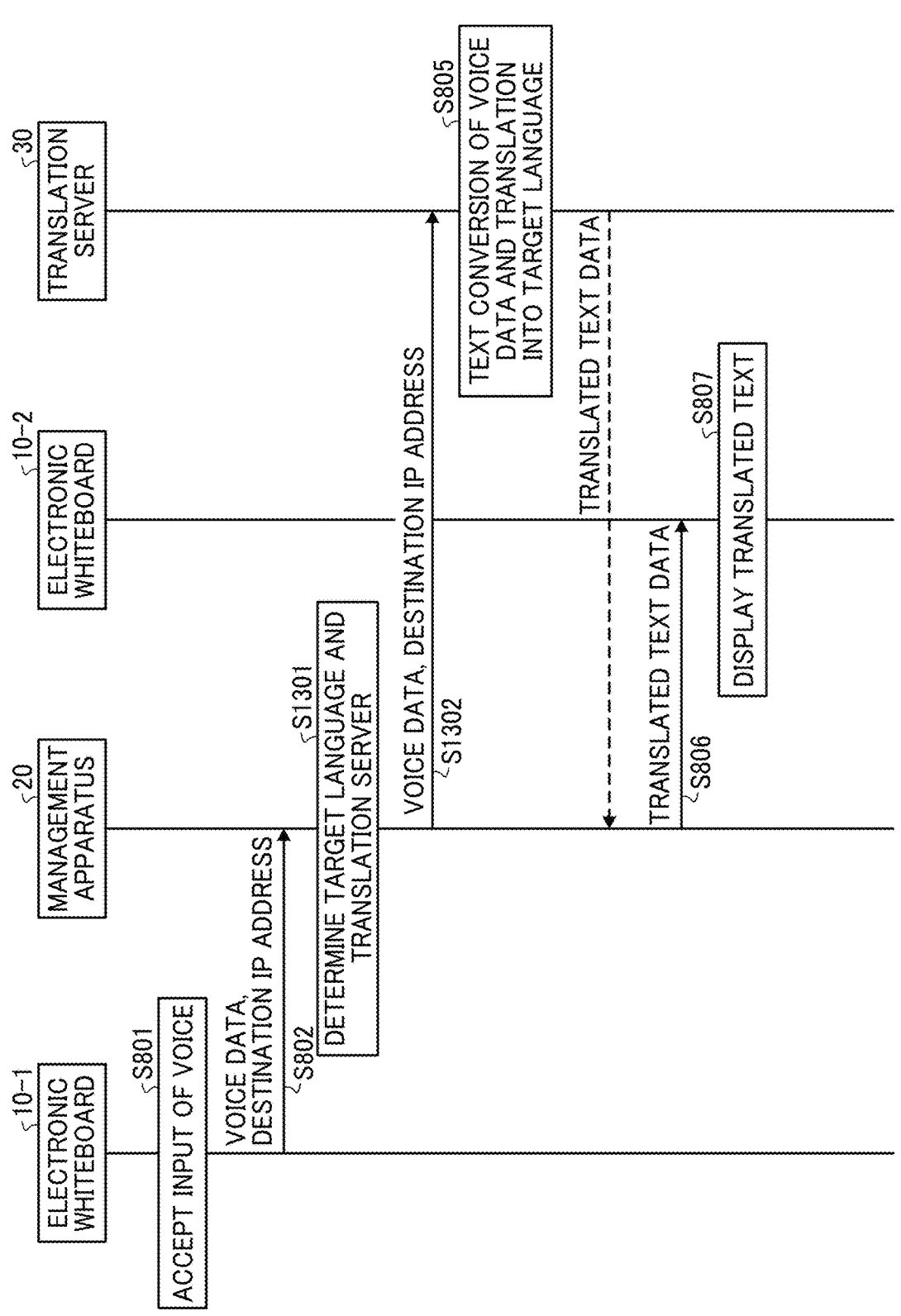
FIG. 13 is a sequence diagram illustrating an example of a translation process performed by the electronic whiteboard system according to a second embodiment of the present disclosure.

First, a description is given of a process of translating, at the translation server 30, voice that is input to the electronic whiteboard 10-1 and thereafter displaying a result of the translation at the electronic whiteboard 10-2, with reference to FIG. 13. FIG. 13 is a sequence diagram illustrating an example of a translation process performed by the electronic whiteboard system 1 according to the second embodiment. The processes of S801 to S802 and S805 to S807 are performed in substantially the similar manner to the first embodiment, and redundant description thereof is omitted.

Subsequent to S802, in response to receiving voice data and a destination IP address at the communication unit 201, the target language determination unit 202A of the management apparatus 20 determines a target language and the translation server 30 based on the received destination IP address (S1301). A detailed description is given later of a process of determining the target language and the translation server 30 at S1301.

In a case in which the management apparatus 20 receives a plurality of destination IP addresses from the electronic whiteboard 10, the management apparatus 20 determines, for each of the plurality of destination IP addresses, a target language and the translation server 30. More specifically, for example, it is assumed that the management apparatus 20 receives a first destination IP address and a second destination IP address. In this case, the target language determination unit 202A of the management apparatus 20 determines a first target language (e.g., English) and a first translation server 30 (e.g., translation server 30C) based on the first destination IP address. Further, the target language determination unit 202A of the management apparatus 20 determines a second target language (e.g., German) and a second translation server 30 (e.g., translation server 30B) based on the second destination IP address.

Next, the communication unit 201 of the management apparatus 20 transmits, to the translation server 30 determined by the target language determination unit 202A, the voice data and designation of the target language determined by the target language determination unit 202A (S1302). With the processes from S801 to S1302, the management apparatus 20 requests the translation server 30, that is determined by the target language determination unit 202A, to convert voice represented by the voice data into text and translate the text into the designated target language. In other words, the management apparatus 20 is able to request the translation server 30 that is capable of performing translation into the designated target language with high accuracy (and/or at high speed) to translate voice data.

In a case in which the management apparatus 20 determines a plurality of target languages and a plurality of the translation servers 30 at S1301, the management apparatus 20 performs the process of S1302 for each of the plurality of target languages. More specifically, for example, it is assumed that the management apparatus 20 determines a target language "English" and the translation server 30C, and a target language "German" and the translation server 30C at S1301. In this case, the communication unit 201 of the management apparatus 20 transmits the voice data and designation of the target language "English" to the translation server 30C. Further, the communication unit 201 of the management apparatus 20 transmits the voice data and designation of the target language "German" to the translation server 30B.

Figure 14:
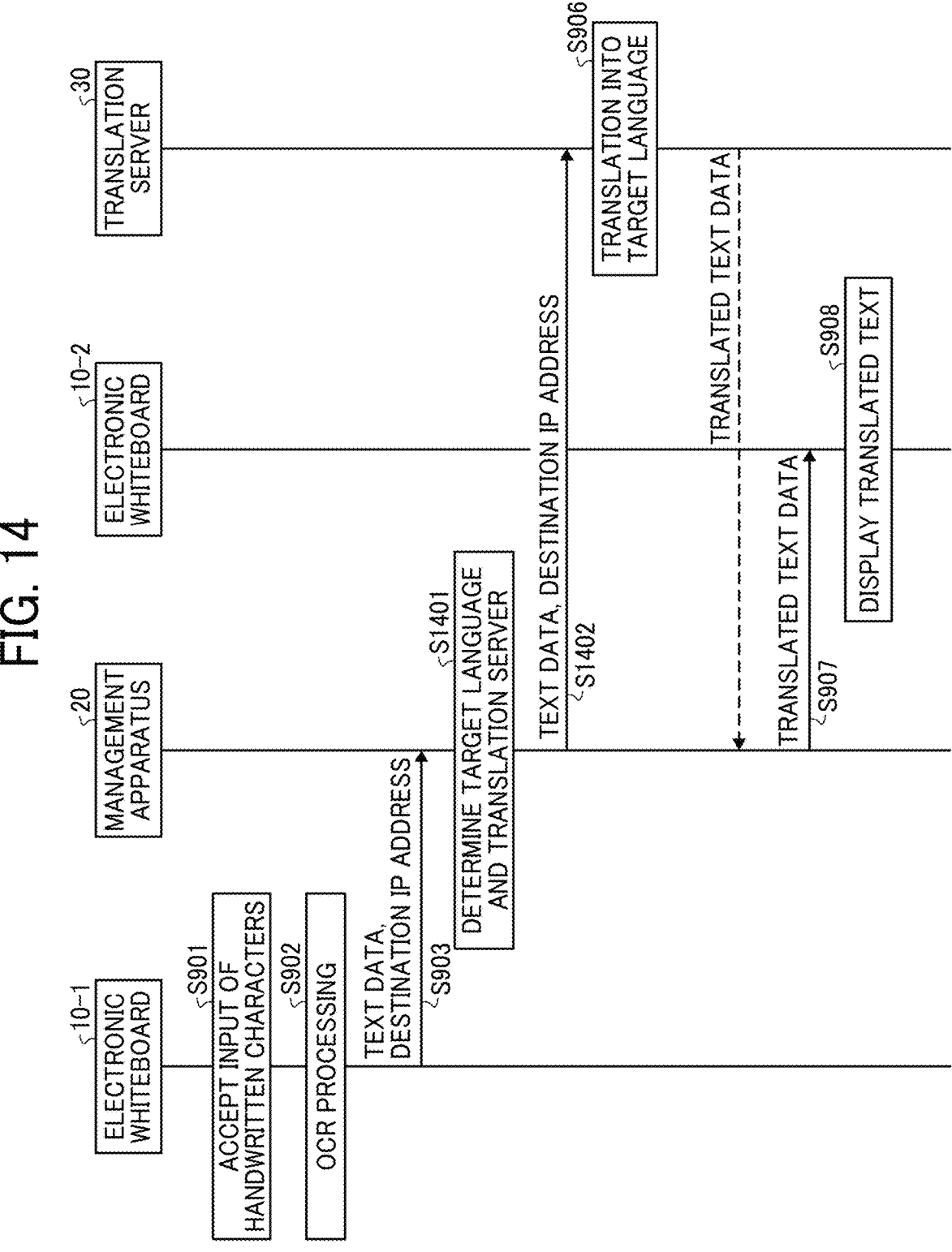
FIG. 14 is a sequence diagram illustrating another example of a translation process performed by the electronic whiteboard system according to a second embodiment of the present disclosure.

Next, a description is given of a process of converting handwritten characters input to the electronic whiteboard 10-1 into text, translating this text at the translation server 30, and thereafter displaying a result of the translation at the electronic whiteboard 10-2, with reference to FIG. 14. FIG. 14 is a sequence diagram illustrating another example of a translation process performed by the electronic whiteboard system 1 according to the second embodiment. The processes of S901 to S903 and S906 to S908 are performed in substantially the similar manner to the first embodiment, and redundant description thereof is omitted.

Subsequent to S903, in response to receiving text data and a destination IP address at the communication unit 201, the target language determination unit 202A of the management apparatus 20 determines a target language and the translation server 30 based on the received destination IP address (S1401). A detailed description is given later of a process of determining the target language and the translation server 30 at S1401.

In a case in which the management apparatus 20 receives a plurality of destination IP addresses from the electronic whiteboard 10, the management apparatus 20 determines, for each of the plurality of destination IP addresses, a target language and the translation server 30, in substantially the same manner as S1301 of FIG. 13.

Next, the communication unit 201 of the management apparatus 20 transmits, to the translation server 30 determined by the target language determination unit 202A, the text data and designation of the target language determined by the target language determination unit 202A (S1402). With the processes from S901 to S1402, the management apparatus 20 requests the translation server 30 to translate text represented by the text data into the designated target language. In other words, the management apparatus 20 is able to request the translation server 30 that is capable of performing translation into the designated target language with high accuracy (and/or at high speed) to translate text data.

In a case in which the management apparatus 20 determines a plurality of target languages and a plurality of the translation servers 30 at S1401, the management apparatus 20 performs the process of S1402 for each of the plurality of target languages, in substantially the same manner as described above referring to S1302 of FIG. 13.

Figure 15:
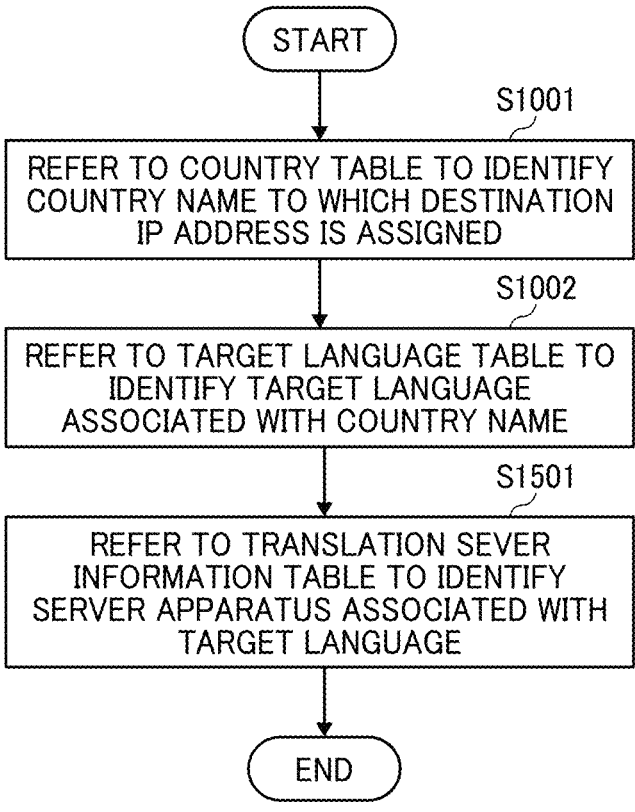
FIG. 15 is a flowchart illustrating an example of a process of determining a target language and a translation server according to a second embodiment of the present disclosure.

Hereinafter, a description is given of a process of determining the target language and the translation server 30 at S1301 of FIGS. 13 and S1401 of FIG. 14, with reference to FIG. 15. FIG. 15 is a flowchart illustrating an example of process of determining the target language and the translation server 30 according to the second embodiment.

Subsequent to S1002, the translation server selection unit 213 refers to the translation server information table 430 stored in the translation server information table memory 330, to determine the translation server 30 based on the target language determined by the language identification unit 212 (S1501). For example, in a case in which the language identification unit 212 identifies a target language "English", the translation server selection unit 213 identifies a server name "Server C" (i.e., translation server 30C) associated with "English", referring to the translation server information table 430 illustrated in FIG. 12.

Thus, the target language determination unit 202A determines a target language and the translation server 30 that is to be requested to perform translation into the target language, based on a destination IP address received from the electronic whiteboard 10.

As described heretofore, the electronic whiteboard system 1 according to the second embodiment determines a target language of translation and the translation server 30 that is to translate voice data or text data into the target language, based on destination information (e.g., IP address) to which the voice data or the text data is to be transmitted. Further, the electronic whiteboard system 1 according to the second embodiment requests the determined translation server 30 to translate the voice data and the text data with designation of the determined target language.

With the configurations and the processes as described above, the electronic whiteboard system 1 according to the second embodiment is able to cause the translation server 30 that is capable of performing translation into a target language with high accuracy and/or at high speed to perform translation, from among a plurality of the translation servers 30.

Third Embodiment

Hereinafter, a description is given of a third embodiment of the present disclosure. In the above, a description is given of the second embodiment according to which the translation server 30 is determined based on a target language. However, the accuracy or speed of translation by the translation server 30 may also vary depending on a source language.

In other words, for example, a certain translation server 30 may perform translation from German as a source language into English as a target language with high accuracy, while the accuracy of translation by the same translation server 30 from Japanese as a source language into English as a target language may be low. In other words, even when a target language is the same, a certain translation server 30 may provide translation with different levels of accuracy and/or different speed, depending on a source language.

In view of this, in third embodiment, when the electronic whiteboard system 1 is capable of using a plurality of translation servers 30, the electronic whiteboard system 1 requests a selected translation server 30 from among the plurality of translation servers 30 to perform translation depending on a target language and a source language.

In substantially the same manner as the second embodiment, the server names of the translation server 30A, the translation server 30B, the translation server 30C, and the translation server 30D are hereinafter referred to as a "Server A", "Server B", "Server C", and "Server D", respectively, for the sake of explanatory convenience.

<Functional Configuration>

First, a description is given hereinafter of a functional configuration of the electronic whiteboard system 1 according to the third embodiment, with reference to FIG. 16. FIG. 16 is a block diagram illustrating a functional configuration of the electronic whiteboard system 1 according to the third embodiment. Redundant description of functional units that are same as those of the first embodiment is omitted below.

As illustrated in FIG. 16, the management apparatus 20 according to the third embodiment includes a target language determination unit 202B. Further, the management apparatus 20 according to the third embodiment includes a translation server information table memory 330A.

The target language determination unit 202B determines a target language and the translation server 30 that is to be requested to perform translation, based on a destination IP address received by the communication unit 201 and an IP address (sender IP address) of the electronic whiteboard 10 that transmits the destination IP address. The target language determination unit 202B includes a country name identification unit 211A, a language identification unit 212A, and a translation server selection unit 213A.

The country name identification unit 211A refers to the country name table 410 stored in the country name table memory 310, to identify a country name (destination country name) to which the destination IP address is assigned, and a country name (sender country name) to which the sender IP address is assigned.

The language identification unit 212A refers to the target language table 420 stored in the target language table memory 320, to identify a target language based on the destination country name identified by the country name identification unit 211A. Further, the language identification unit 212A refers to the target language table 420 stored in the target language table memory 320, to identify a source language based on the sender country name identified by the country name identification unit 211A.

The translation server selection unit 213A refers to a translation server information table 430A stored in the translation server information table memory 330, to determine the translation server 30 that is to translate voice data or text data, based on the target language and the source language identified by the language identification unit 212A.

The translation server information table memory 330A stores the translation server information table 430A. Hereinafter, a description is given of the translation server information table 430A, with reference to FIG. 17. FIG. 17 illustrates an example of the translation server information table 430A.

As illustrated in FIG. 17, the translation server information table 430A stores a source language and a target language in association with and a name (server name) of the translation server 30 that performs translation from the associated source language into the associated target language with high accuracy (and/or at high speed).

For example, a combination of a source language "Japanese" and a target language "German" is associated with a server name "Server B". This means that the translation server 30B having a server name of "Server B", is capable of providing translation with high accuracy, when a source language is Japanese and a target language is German.

Further, for example, a combination of a source language "Japanese" and a target language "English" is associated with a server name "Server C". This means that the translation server 30C having a server name of "Server C", is capable of providing translation with high accuracy, when a source language is Japanese and a target language is English.
<Operation>

Hereinafter, a description is given in detail of an operation performed by the electronic whiteboard system 1 according to the third embodiment. Hereinafter, a description is given of a process of determining the target language and the translation server 30 at S1301 of FIGS. 13 and S1401 of FIG. 14 described in the second embodiment, with reference to FIG. 18. FIG. 18 is a flowchart illustrating an example of process of determining the target language and the translation server 30 according to the third embodiment.

First, the country name identification unit 211A refers to the country name table 410 stored in the country name table memory 310, to identify a country name (destination country name) to which the destination IP address is assigned, and a country name (sender country name) to which the sender IP address is assigned (S1801). In one example, the sender IP address can be obtained from, for example, a header of voice data received at S802 of FIG. 13 or at S903 of FIG. 14.

Next, the language identification unit 212A refers to the target language table 420 stored in the target language table memory 320, to identify a target language and a source language, based on a destination country name and a sender country name, respectively (S1802).

Next, the translation server selection unit 213A refers to the translation server information table 430A stored in the translation server information table memory 330, to determine the translation server 30 based on the target language and the source language determined by the language identification unit 212A (S1803). For example, in a case in which the language identification unit 212 identifies "Japanese" and "English" as a source language and a target language, respectively, the translation server selection unit 213A identifies a server name "Server C" (i.e., translation server 30C) associated with the combination of "Japanese" and "English", referring to the translation server information table 430A illustrated in FIG. 17.

Thus, the target language determination unit 202B determines the translation server 30 depending on a source language and a target language, based on a destination IP address received from the electronic whiteboard 10 and an IP address (sender IP address) of the electronic whiteboard 10 from which the destination IP address is received.

As described heretofore, the electronic whiteboard system 1 according to the third embodiment determines a target language and a source language, based on destination information (e.g., destination IP address) to which voice data or text data is to be transmitted and sender information (e.g., sender IP address) from which the voice data or the text data is transmitted. Further, the electronic whiteboard system 1 according to the third embodiment determines the translation server 30 depending on the source language and the target language, and requests the determined translation server 30 to translate the voice data and the text data with designation of the determined target language.

Accordingly, the electronic whiteboard system 1 according to the third embodiment is able to cause the translation server 30 that is capable of performing translation with high accuracy and/or at high speed to perform translation, from among a plurality of the translation servers 30, depending on a source language and a target language.

Fourth Embodiment

Hereinafter, a description is given of a fourth embodiment of the present disclosure. In the fourth embodiment, when a meeting is held using a plurality of the electronic whiteboards 10, a language used in each of the plurality of electronic whiteboards 10 is obtained when a session is established, and the management apparatus 20 manages the obtained language. Examples of the language used in the electronic whiteboard 10 include a language that is set for software such as an OS.

This enables the electronic whiteboard system 1 according to the fourth embodiment to determine a target language based on a language that is set to software such as an OS installed in the electronic whiteboard 10 as a connection destination.
<Functional Configuration>

Figure 19:
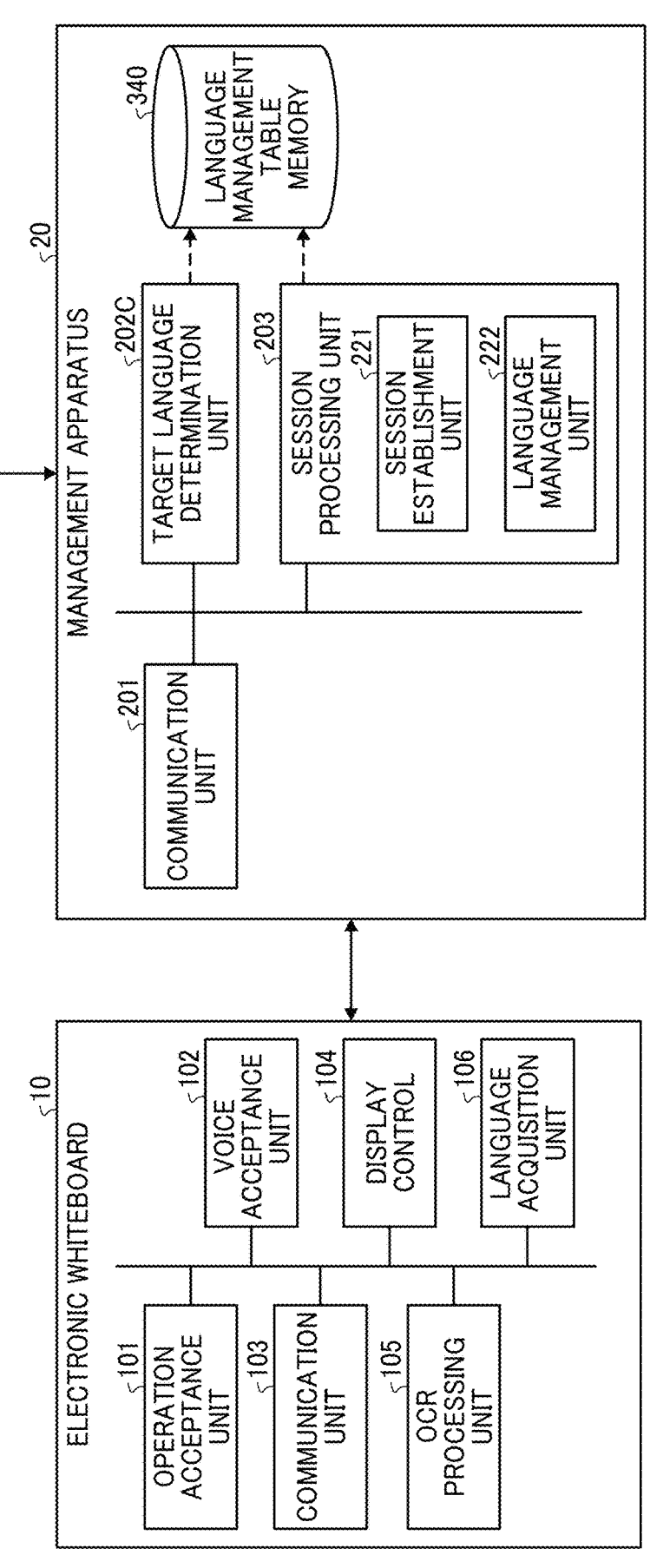
FIG. 19 is a block diagram illustrating an example of a functional configuration of the electronic whiteboard system according to a fourth embodiment of the present disclosure.

First, a description is given hereinafter of a functional configuration of the electronic whiteboard system 1 according to the fourth embodiment, with reference to FIG. 19. FIG. 19 is a block diagram illustrating a functional configuration of the electronic whiteboard system 1 according to the fourth embodiment.

As illustrated in FIG. 19, the electronic whiteboard 10 according to the fourth embodiment includes a language acquisition unit 106. This functional unit is implemented by processes executed by the CPU 17 according to one or more programs installed on the electronic whiteboard 10.

In response to accepting a connection instruction (instruction for establishing a session between the electronic whiteboard 10 and the other electronic whiteboard 10) at the operation acceptance unit 101, for example, the language acquisition unit 106 obtains language (used language) used in the electronic whiteboard 10. Examples of the used language include a language that is set to specific software installed in the electronic whiteboard 10, such as an OS or various application programs that runs on the OS.

As illustrated in FIG. 19, the management apparatus 20 according to the fourth embodiment includes a target language determination unit 202C and a session processing unit 203. The session processing unit 203 is implemented by processes executed by the CPU 27 according to one or more programs installed on the management apparatus 20.

Further, the management apparatus 20 according to the fourth embodiment includes a language management table memory 340. The memory 340 is implemented by, for example, the HDD 28. In another example, the memory 340 may be implemented by a storage device connected to the management apparatus 20 via the network N1.

The target language determination unit 202C refers to a language management table 440 stored in the language management table memory 340, to determine a target language based on a destination IP address.

The session processing unit 203 performs a process of establishing a session between two or more electronic whiteboards 10. The session processing unit 203 includes a session establishment unit 221 and a language management unit 222.

The session establishment unit 221 transmits and receives a request for establishing a session at the communication unit 201 to establish a session between two or more electronic whiteboards 10.

The language management unit 222 manages IP addresses of the electronic whiteboards 10 between which a session is established and used languages of the electronic whiteboards 10 at the language management table 440. In other words, the language management unit 222 stores, in the language management table 440, the IP addresses of the electronic whiteboards 10 between which a session is established in association with the used languages of the electronic whiteboards 10.

The language management table memory 340 stores the language management table 440. Hereinafter, a description is given of the language management table 440 with reference to FIG. 20. FIG. 20 illustrates an example of the language management table 440.

As illustrated in FIG. 20, the language management table 440 stores the IP addresses of the electronic whiteboards 10 between which a session is established in association with the used languages of the electronic whiteboards 10.

For example, an IP address "xxx.xxx.xxx.xxx" is associated with a used language "Japanese". Further, an IP address "yyy.yyy.yyy.yyy" is associated with a used language "English".

This indicates that a session has been established between the electronic whiteboard 10 having an IP address of "xxx.xxx.xxx.xxx" and the electronic whiteboard 10 having an IP address of "yyy.yyy.yyy.yyy".

<Operation>

Hereinafter, a description is given in detail of an operation performed by the electronic whiteboard system 1 according to the fourth embodiment.

Figure 21:
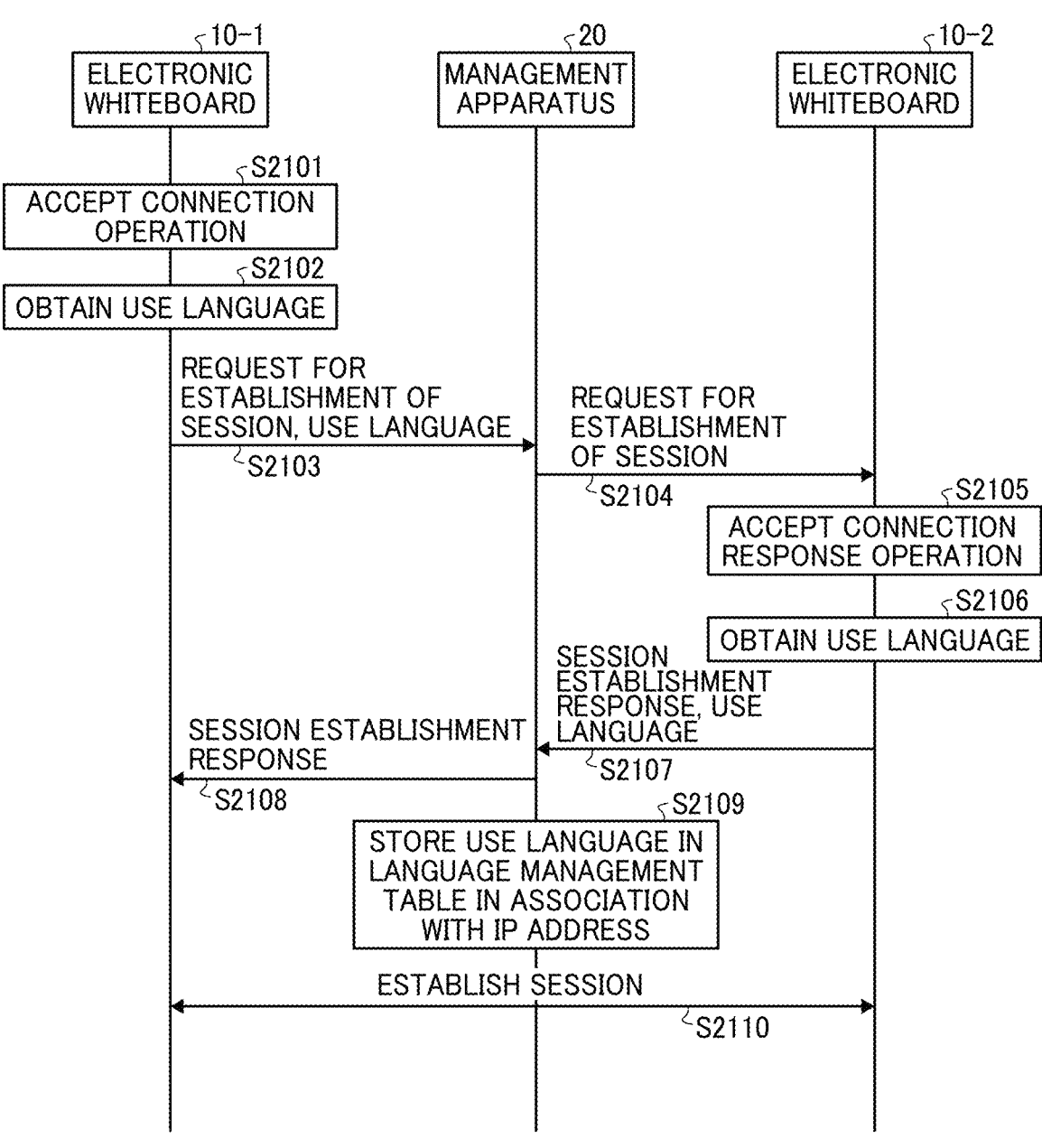
FIG. 21 is a sequence diagram illustrating an example of a process of establishing a session by the electronic whiteboard system according to a fourth embodiment of the present disclosure.

First, a description is given of a process of establishing a session between two or more electronic whiteboards 10 to enable those electronic whiteboards 10 to hold a meeting, a lecture, etc., with reference to FIG. 21. FIG. 21 is a sequence diagram illustrating an example of a process of establishing a session by the electronic whiteboard system 1 according to the fourth embodiment. The following description is given assuming that a session is established between the electronic whiteboard 10-1 and the electronic whiteboard 10-2.

First, the operation acceptance unit 101 of the electronic whiteboard 10-1 accepts an instruction (connection instruction) for establishing a session between the electronic whiteboard 10-1 and the electronic whiteboard 10-2 (S2101). For example, at this step, a user of the electronic whiteboard 10-1 selects the electronic whiteboard 10-2 from a screen listing communicable electronic whiteboards 10 displayed on the display device 12 of the electronic whiteboard 10-1 to give a connection instruction.

In response to accepting a connection instruction at the operation acceptance unit 101, the language acquisition unit 106 of the electronic whiteboard 10-1 acquires a used language of the electronic whiteboard 10-1 (S2102). In one example, the language acquisition unit 106 acquires a language that is set to an OS. In another example, the language acquisition unit 106 acquires a language that is set to a specific application that runs on the OS.

Next, the communication unit 103 of the electronic whiteboard 10-1 transmits, to the management apparatus 20, a session establishment request that designates an IP address of the other electronic whiteboard 10 (i.e., electronic whiteboard 10-2) as a destination for connection and the used language acquired by the language acquisition unit 106 (S2103).

In response to receiving the session establishment request at the communication unit 201, the session establishment unit 221 of the management apparatus 20 transmits the session establishment request to the electronic whiteboard 10-2 (S2104).

The operation acceptance unit 101 of the electronic whiteboard 10-2 accepts an instruction (connection response instruction) for establishing a session between the electronic whiteboard 10-2 and the electronic whiteboard 10-1 (S2105). For example, at this step, in response to receiving the session establishment request at the communication unit 103, the display control 104 of the electronic whiteboard 10-2 displays a screen for enabling a user to select whether to permit a connection between the electronic whiteboard 10-2 itself and the electronic whiteboard 10-1. The user of the electronic whiteboard 10-2 selects permission of the connection between the electronic whiteboard 10-2 itself and the electronic whiteboard 10-1 on the screen to give the connection response instruction.

Next, in response to accepting the connection response instruction at the operation acceptance unit 101, the language acquisition unit 106 of the electronic whiteboard 10-2 acquires a used language of the electronic whiteboard 10-2 (S2106). The language acquisition unit 106 may acquire a language that is set to an OS, in substantially the same manner as S2102. Alternatively, the language acquisition unit 106 may acquire a language that is set to a specific application that runs on the OS.

Next, the communication unit 103 of the electronic whiteboard 10-2 transmits, to the management apparatus 20, a session establishment response and the used language acquired by the language acquisition unit 106 (S2107).

In response to receiving the session establishment response from the electronic whiteboard 10-2, the communication unit 201 of the management apparatus 20 transmits the session establishment response to the electronic whiteboard 10-1 (S2108).

Next, the language management unit 222 of the management apparatus 20 stores, in the language management table 440, the IP address of the electronic whiteboard 10-1 in association with the used language of the electronic whiteboard 10-1. Further, the language management unit 222 of the management apparatus 20 stores, in the language management table 440, the IP address of the electronic whiteboard 10-2 in association with the used language of the electronic whiteboard 10-2 (S2109).

In other words, the language management unit 222 stores, in the language management table 440, the IP address of the electronic whiteboard 10-1 in association with the used language of the electronic whiteboard 10-1. Further, the language management unit 222 stores, in the language management table 440, the IP address of the electronic whiteboard 10-2 in association with the used language of the electronic whiteboard 10-2.

Next, the session establishment unit 221 of the management apparatus 20 establishes a session between the electronic whiteboard 10-1 and the electronic whiteboard 10-2 (S2110). Through the established session, the electronic whiteboard 10-1 and the electronic whiteboard 10-2 can exchange voice data or text data with each other via the management apparatus 20.

As described heretofore, when a session is established between two or more electronic whiteboards 10, the electronic whiteboard system 1 according to the fourth embodiment manages the IP addresses and the used language of the two or more electronic whiteboards 10 by the management apparatus 20.

Figure 22:
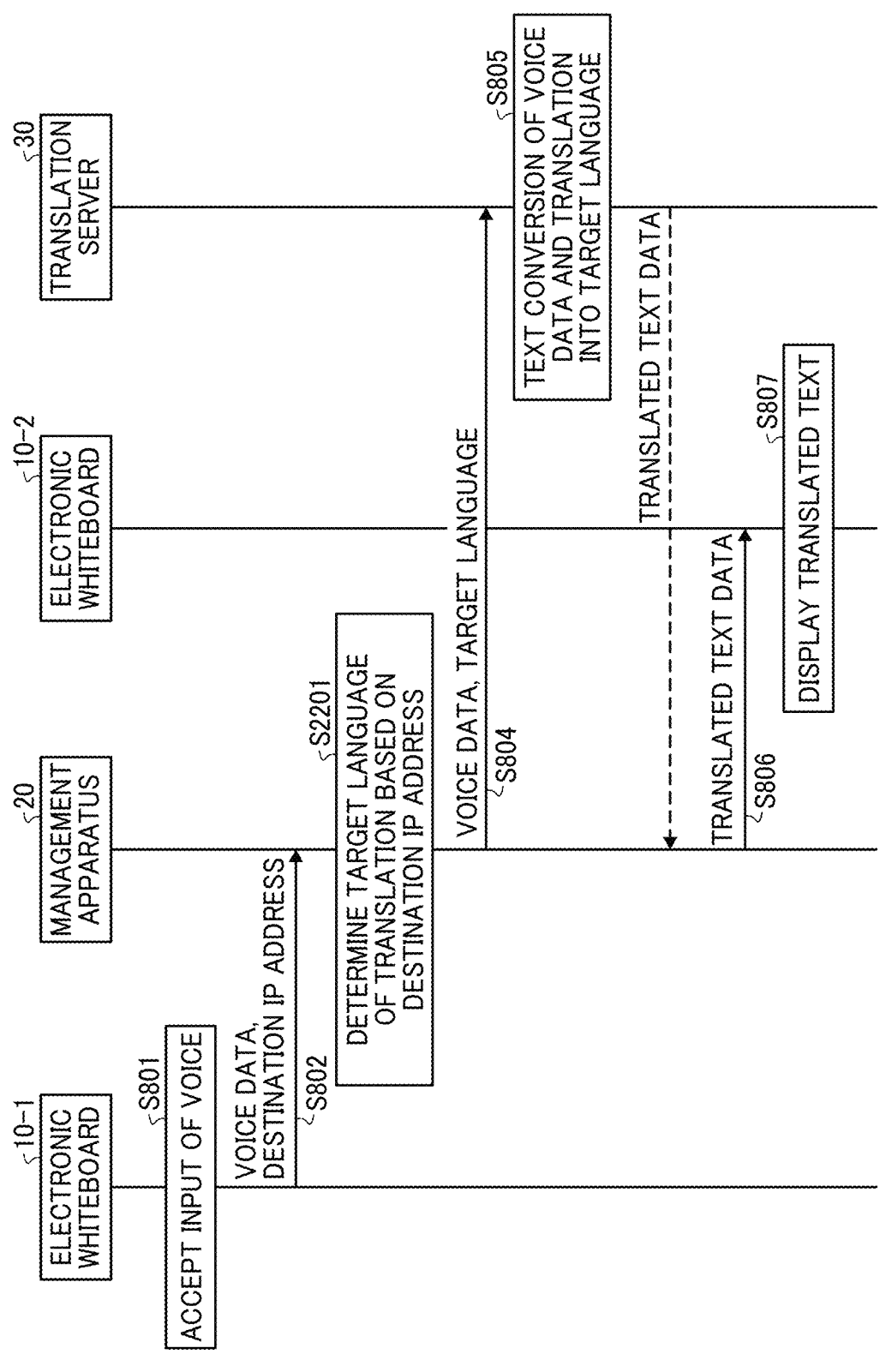
FIG. 22 is a sequence diagram illustrating an example of a translation process performed by the electronic whiteboard system according to a fourth embodiment of the present disclosure.

Hereinafter, a description is given of a process of translating, at the translation server 30, voice that is input to the electronic whiteboard 10-1 and thereafter displaying a result of the translation at the electronic whiteboard 10-2, with reference to FIG. 22. FIG. 22 is a sequence diagram illustrating an example of a translation process performed by the electronic whiteboard system 1 according to the fourth embodiment. The processes of S801 to S802 and S804 to S807 are performed in substantially the similar manner to the first embodiment, and redundant description thereof is omitted.

Subsequent to S802, the target language determination unit 202C of the management apparatus 20 refers to the language management table 440 stored in the language management table memory 340, to determine a target language based on a destination IP address (S2201). More specifically, the target language determination unit 202C identifies a used language associated with the destination IP address received at the communication unit 201, referring to the language management table 440. The used language identified as above is a target language.

In a case in which the management apparatus 20 receives a plurality of destination IP addresses from the electronic whiteboard 10, the management apparatus 20 determines, for each of the plurality of destination IP addresses, a target language.

Next, a description is given of a process of converting handwritten characters input to the electronic whiteboard 10-1 into text, translating this text at the translation server 30, and thereafter displaying a result of the translation at the electronic whiteboard 10-2, with reference to FIG. 23. FIG. 23 is a sequence diagram illustrating another example of a translation process performed by the electronic whiteboard system 1 according to the fourth embodiment. The processes of S901 to S903 and S905 to S908 are performed in substantially the similar manner to the first embodiment, and redundant description thereof is omitted.

Subsequent to S903, the target language determination unit 202C of the management apparatus 20 refers to the language management table 440 stored in the language management table memory 340, to determine a target language based on a destination IP address (S2301). More specifically, in substantially the same manner as S2201 of FIG. 22, the target language determination unit 202C identifies a used language associated with the destination IP address received at the communication unit 201, referring to the language management table 440. The used language identified as above is a target language.

As described heretofore, when a session is established between two or more electronic whiteboards 10, the electronic whiteboard system 1 according to the fourth embodiment manages the IP addresses and the used language of the two or more electronic whiteboards 10 by the management apparatus 20. Further, the electronic whiteboard system 1 according to the fourth embodiment determines the target language based on the IP address and the used language managed by the management apparatus 20, and requests the translation server 30 to translate voice data or text data with designation of the determined target language.

Thus, when a meeting, a lecture, etc. is held using a plurality of electronic whiteboards 10, the electronic whiteboard system 1 according to the fourth embodiment is able to determine a language of a user who is participating in the meeting by using the electronic whiteboard 10 as a connection destination as a target language. This enables to perform translation into an appropriate target language, even when a country where the electronic whiteboard 10 is provided does not match a used language (e.g., when the electronic whiteboard 10 is provided in Germany and the used language is English).

According to an embodiment of the present disclosure, when a meeting, a lecture, etc. is held using a plurality of electronic whiteboards at remote sites, for example, a translation service can be used without setting a target language in advance.

Voice data and text data are each an example of content data described in the appended claims. Voice and text are each an example of contents described in the appended claims. The electronic whiteboard system 1 is an example of an information processing system described in the appended claims. The electronic whiteboard 10 or the management apparatus 20 is an example of an information processing apparatus described in the appended claims. The electronic whiteboard 10 is an example of an electronic device described in the appended claims. The communication unit 201 and the communication unit 103 are each an example of a receiver and a transmitter described in the appended claims. The target language determination unit 202 is an example of circuitry described in the appended claims. An IP address is an example of destination information described in the appended claims. A server name is an example of identification information described in the appended claims. A country is an example of a region described in the appended claims. The operation acceptance unit 101 and the voice acceptance unit 102 is an example of circuitry described in the appended claims. The display control 104 is an example of circuitry described in the appended claims. The country name table memory 310 is an example of a memory described in the appended claims. The target language table memory 320 is an example of a memory described in the appended claims. The translation server information table memory 330 is an example of a memory described in the appended claims. The translation server information table memory 330A is an example of a memory described in the appended claims. The language management table memory 340 is an example of a memory described in the appended claims.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array), SOC (system on chip), GPU, and conventional circuit components arranged to perform the recited functions.

Any one of the above-described operations may be performed in various other ways, for example, in an order different from the one described above.

What is claimed is:

1. A system connected with a first electronic device and a second electronic device, the system comprising:

circuitry configured to establish a session for a meeting between the first electronic device and the second electronic device in response to receiving a request from the first electronic device, the first electronic device and the second electronic device configured to exchange first data input by handwriting and voice data input by voice through the established session, store, in a memory, a second language transmitted from the second electronic device in association with destination information corresponding with the second electronic device, receive, from the first electronic device through the established session, voice data expressed in a first language and destination information indicating a destination for the voice data, identify the second language as a translation language by referring to the memory based on the destination information, translate the received voice data expressed in the first language into text data expressed in the second language, transmit the text data expressed in the second language to the second electronic device through the established session, receive the first data input by handwriting on the first electronic device from the first electronic device through the established session, and transmit second data to the second electronic device through the established session, the second data being based on the first data, wherein the second electronic device is configured to display the second data and the translated text data expressed in the second language on a display of the second electronic device.

2. The system of claim 1, wherein the circuitry is further configured to:

convert the received voice data expressed in the first language into converted text data; and translate the converted text data into the text data expressed in the second language.

3. The system of claim 1, wherein the second language is a language set in software of the second electronic device.

4. The system of claim 1, wherein the circuitry is further configured to receive the voice data expressed in the first language from the first electronic device after the session is established.

5. The system of claim 1, wherein the circuitry is further configured to receive the second language transmitted from the second electronic device in response to the second electronic device receiving an operation for establishing the session with the first electronic device.

6. The system of claim 1, wherein each of the first electronic device and the second electronic device is at least one of a personal computer, a smartphone, a tablet terminal, a game console, a videoconference terminal, or a multifunction peripheral (MFP).

7. The system of claim 1, wherein the second language is a used language set to an operating system of the second electronic device.

8. The system of claim 1, wherein the circuitry is further configured to:

identify a translation server, of a plurality of translation servers, based on the destination information; and transmit the text data expressed in the second language to the second electronic device via the identified translation server.

9. The system of claim 1, wherein the destination information is an IP address of the second electronic device.

10. The system of claim 1, wherein the circuitry is further configured to:

receive the second language, as the translation language, from the second electronic device before receiving content data from the first electronic device.

11. A management apparatus connected with a first electronic device and a second electronic device, the management apparatus comprising:

circuitry configured to establish a session for a meeting between the first electronic device and the second electronic device in response to receiving a request from the first electronic device, the first electronic device and the second electronic device configured to exchange first data input by handwriting and voice data input by voice through the established session, store, in a memory, a second language transmitted from the second electronic device in association with destination information corresponding with the second electronic device, receive, from the first electronic device through the established session, voice data expressed in a first language and destination information indicating a destination for the voice data, identify the second language as a translation language by referring to the memory based on the destination information, translate the received voice data expressed in the first language into text data expressed in the second language, transmit the text data expressed in the second language to the second electronic device through the established session, receive the first data input by handwriting on the first electronic device from the first electronic device through the established session, and transmit second data to the second electronic device through the established session, the second data being based on the first data, wherein the second electronic device is configured to display the second data and the translated text data expressed in the second language on a display of the second electronic device.

12. The management apparatus of claim 11, wherein the circuitry is further configured to:

convert the received voice data expressed in the first language into converted text data; and translate the converted text data into the text data expressed in the second language.

13. The management apparatus of claim 11, wherein the second language is a language set in software of the second electronic device.

14. The management apparatus of claim 11, wherein the circuitry is further configured to receive the voice data expressed in the first language from the first electronic device after the session is established.

15. The management apparatus of claim 11, wherein the circuitry is further configured to receive the second language transmitted from the second electronic device in response to the second electronic device receiving an operation for establishing the session with the first electronic device.

16. The management apparatus of claim 11, wherein each of the first electronic device and the second electronic device is at least one of a personal computer, a smartphone, a tablet terminal, a game console, a videoconference terminal, or a multifunction peripheral (MFP).

17. An information processing method comprising:

establishing a session for a meeting between a first electronic device and a second electronic device in response to receiving a request from the first electronic device, the first electronic device and the second electronic device configured to exchange first data input by handwriting and voice data input by voice through the established session;

storing, in a memory, a second language transmitted from the second electronic device in association with destination information corresponding with the second electronic device, receiving, from the first electronic device through the established session, voice data expressed in a first language and destination information indicating a destination for the voice data;

identifying the second language as a translation language by referring to the memory based on the destination information;

translating the received voice data expressed in the first language into text data expressed in the second language;

transmitting the text data expressed in the second language to the second electronic device through the established session;

receiving the first data input by handwriting on the first electronic device from the first electronic device through the established session; and transmitting second data to the second electronic device through the established session, the second data being based on the first data, wherein the second electronic device is configured to
display the second data and the translated text data expressed in the second language on a display of the second electronic device.

18. The information processing method of claim 17, wherein the translating the received voice data expressed in the first language includes:

converting the received voice data expressed in the first language into converted text data; and translating the converted text data into the text data expressed in the second language.

19. The information processing method of claim 17, wherein the second language is a language set in software of the second electronic device.

* * * * *